(12) United States Patent
Saito et al.

(10) Patent No.: US 8,644,380 B2
(45) Date of Patent: Feb. 4, 2014

(54) INTEGER PIXEL MOTION ESTIMATION SYSTEM, MOTION ESTIMATION SYSTEM FOR QUARTER-PIXEL LUMINANCE, MOTION ESTIMATION SYSTEM FOR QUARTER-PIXEL CHROMINANCE, MOTION ESTIMATION SYSTEM FOR COMBINED LUMINANCE, MOTION ESTIMATION SYSTEM FOR COMBINED LUMINANCE AND CHROMINANCE, AND MOTION ESTIMATION SYSTEM FOR QUARTER-PIXEL LUMINANCE AND CHROMINANCE

(75) Inventors: Kazuhiro Saito, Osaka (JP); Akira Okamoto, Osaka (JP)

(73) Assignee: MegaChips Corporation, Osaka-shi (JP)

(*) Notice: Subject to any disclaimer, the term of this patent is extended or adjusted under 35 U.S.C. 154(b) by 1575 days.

(21) Appl. No.: 11/763,681

(22) Filed: Jun. 15, 2007

(65) Prior Publication Data

US 2008/0013632 A1   Jan. 17, 2008

(30) Foreign Application Priority Data

Jul. 11, 2006   (JP) ................. 2006-190453

(51) Int. Cl.
*H04B 1/66* (2006.01)
*H04N 7/12* (2006.01)

(52) U.S. Cl.
USPC ............ 375/240.12; 375/240.17; 375/240.16; 375/E7.094; 375/E7.113; 375/E7.125; 375/E7.211

(58) Field of Classification Search
None
See application file for complete search history.

(56) References Cited

U.S. PATENT DOCUMENTS

| 5,717,441 | A | 2/1998 | Serizawa et al. |
| 6,212,231 | B1 | 4/2001 | Takano |
| 6,950,469 | B2 * | 9/2005 | Karczewicz et al. ..... 375/240.17 |
| 7,116,831 | B2 * | 10/2006 | Mukerjee et al. ............. 382/236 |
| 7,280,599 | B2 * | 10/2007 | Karczewicz et al. ..... 375/240.17 |
| 7,305,034 | B2 * | 12/2007 | Srinivasan ............... 375/240.17 |
| 7,317,839 | B2 * | 1/2008 | Holcomb ..................... 382/236 |

(Continued)

FOREIGN PATENT DOCUMENTS

| JP | 61-154362 A | 7/1986 |
| JP | 8-307875 A | 11/1996 |

(Continued)

OTHER PUBLICATIONS

Nakaya, Yuichiro; Harashima, Hiroshi. Motion Compensation Based on Spatial Transformations. IEEE Transactions on Circuits and Systems for Video Technology. vol. 4 Issue: 3. Relevant pp. 339-356, 366, 367. Pub. Date: 1994. Found on the World Wide Web at: http://ieeexplore.ieee.org/stamp/stamp.jsp?tp=&arnumber=305878.*

(Continued)

*Primary Examiner* — Nathan Flynn
*Assistant Examiner* — Jeremiah Avery
(74) *Attorney, Agent, or Firm* — Oblon, Spivak, McClelland, Maier & Neustadt, L.L.P.

(57) ABSTRACT

A RAM_HIME used for integer pixel motion estimation by an IME stores integer pixel luminance data from a SDRAM while satisfying the conditions that improve efficiency in reading an extracted rectangular area. A RAM_HSME used for motion estimation of quarter-pixel accuracy by a SME stores partial quarter-pixel luminance data while satisfying the conditions that improve efficiency in obtaining a rectangular area after calculation by calculation. A RAM_HMEC used for chrominance data generation of quarter-pixel accuracy by a QPG stores integer pixel chrominance data from the SDRAM while satisfying the conditions that improve efficiency in obtaining rectangular areas after calculation by calculation.

6 Claims, 27 Drawing Sheets

(56) References Cited

U.S. PATENT DOCUMENTS

| | | | |
|---|---|---|---|
| 7,577,200 B2* | 8/2009 | Holcomb et al. | 375/240.16 |
| 7,620,109 B2* | 11/2009 | Srinivasan | 375/240.29 |
| 7,623,574 B2* | 11/2009 | Holcomb | 375/240.16 |
| 7,627,036 B2 | 12/2009 | Takakura et al. | |
| 2006/0023792 A1 | 2/2006 | Cho et al. | |
| 2007/0165716 A1 | 7/2007 | Kitamura et al. | |
| 2007/0208919 A1 | 9/2007 | Tanaka et al. | |

FOREIGN PATENT DOCUMENTS

| | | |
|---|---|---|
| JP | 10-191236 A | 7/1998 |
| JP | 2000-259493 A | 9/2000 |
| JP | 2002-199404 A | 7/2002 |
| JP | 2004-222262 | 8/2004 |
| JP | 2005-210647 A | 8/2005 |
| JP | 2006-42364 A | 2/2006 |
| JP | 2007-189518 A | 7/2007 |
| WO | WO 2005/109205 A1 | 11/2005 |

OTHER PUBLICATIONS

Japanese Office Action issued Oct. 12, 2010 in corresponding Japanese Application No. 2006-190453 (with partial English Translation).

\* cited by examiner

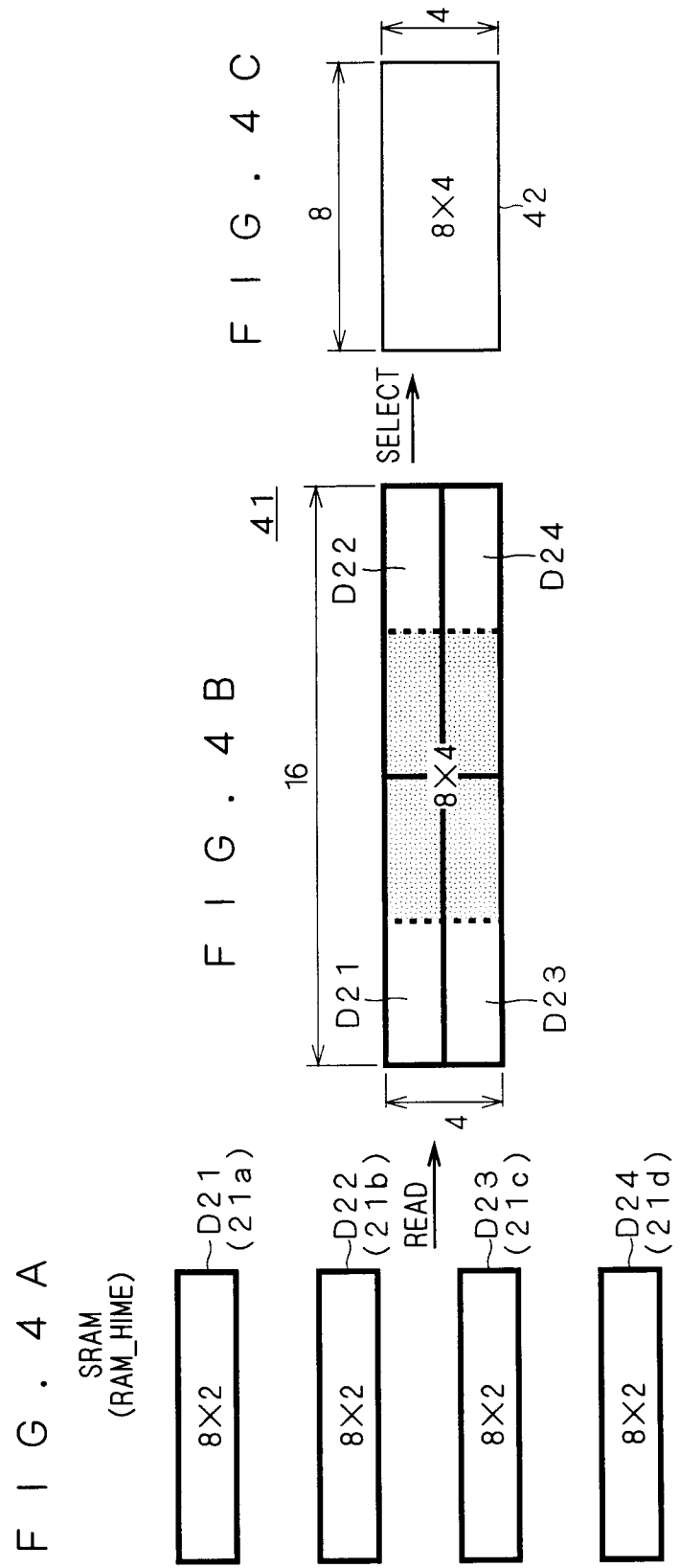

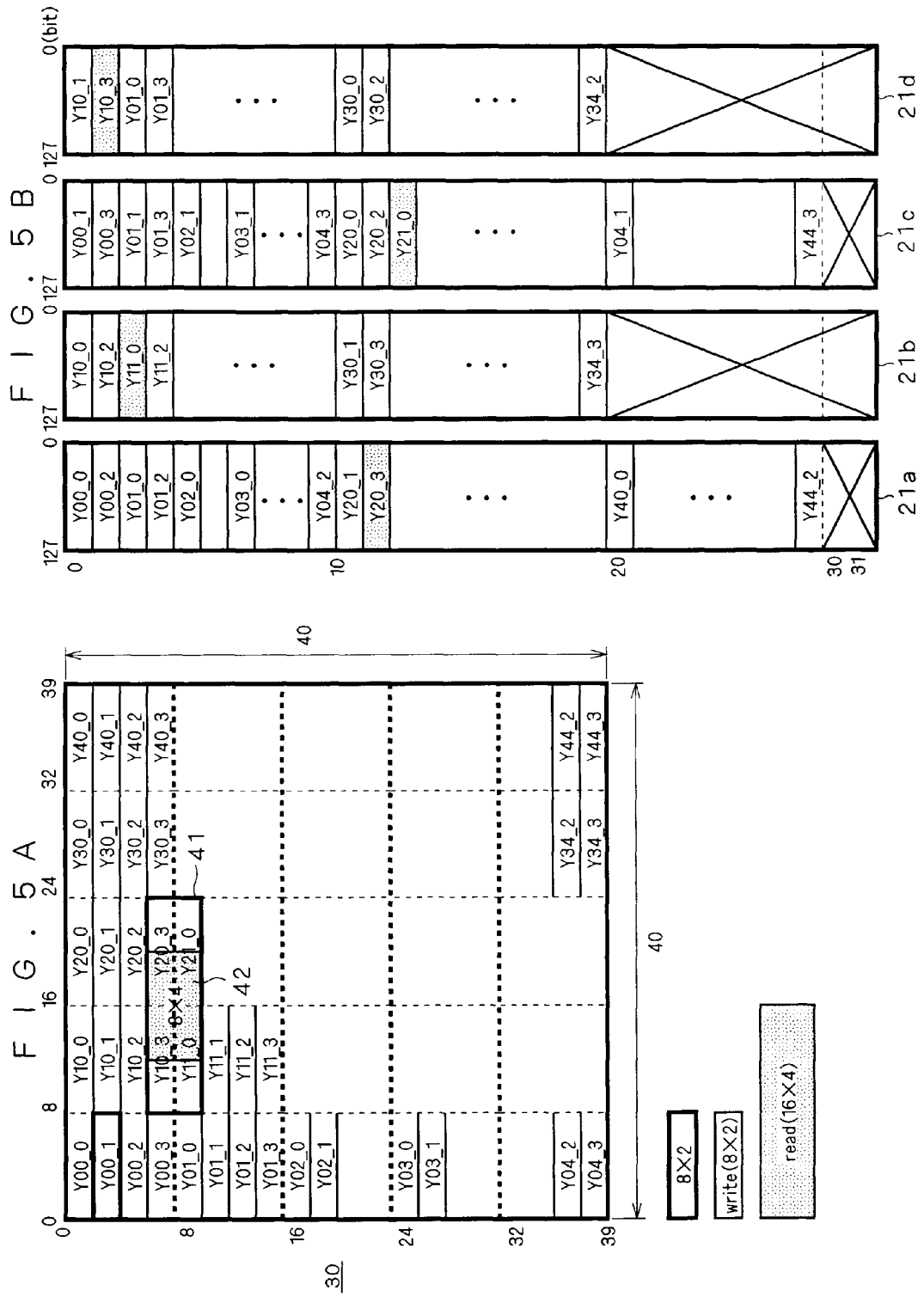

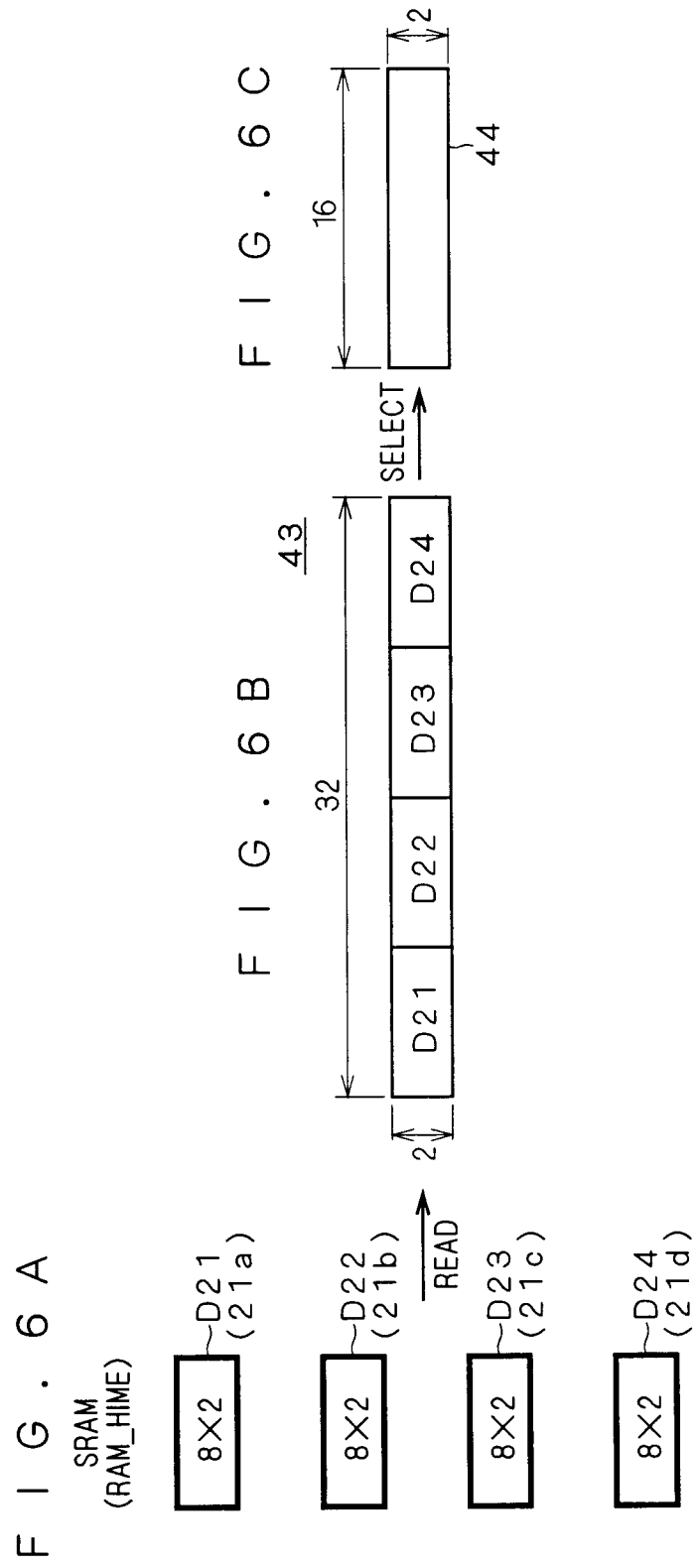

8 CYCLES

9 CYCLES

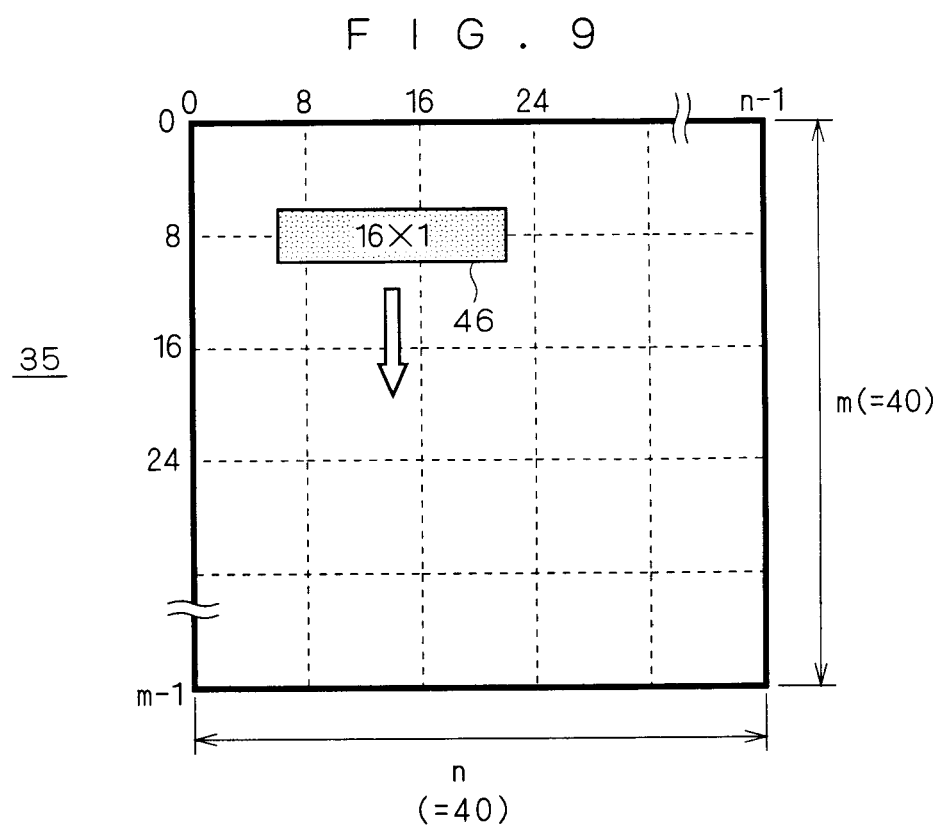

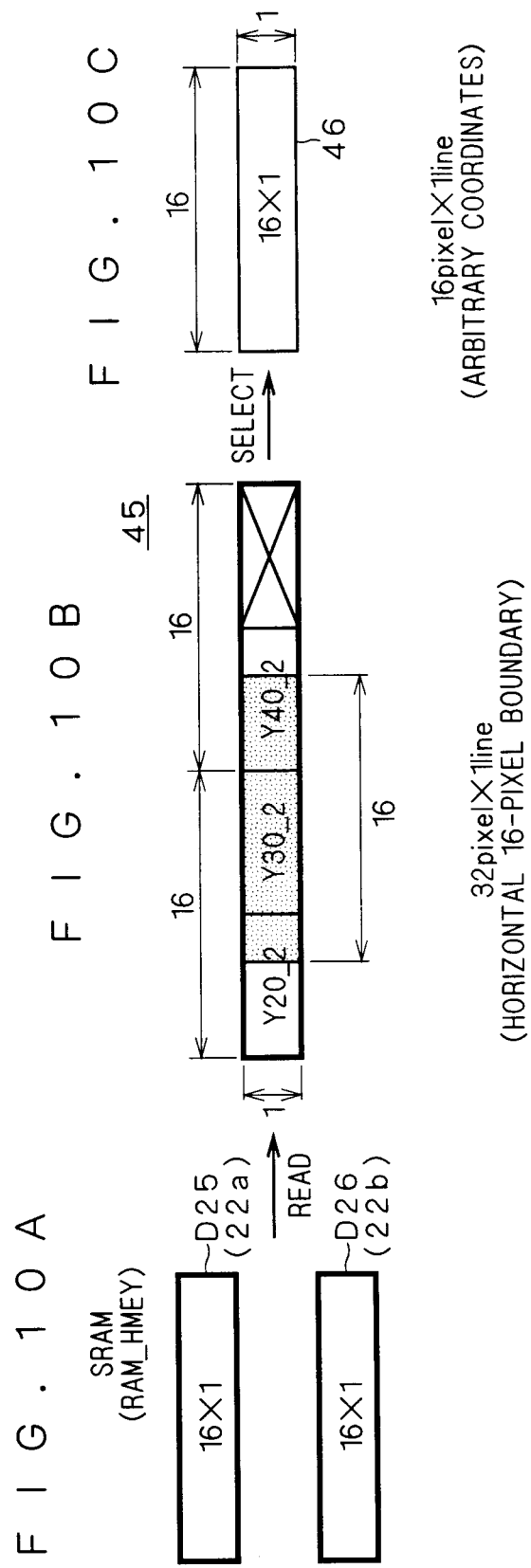

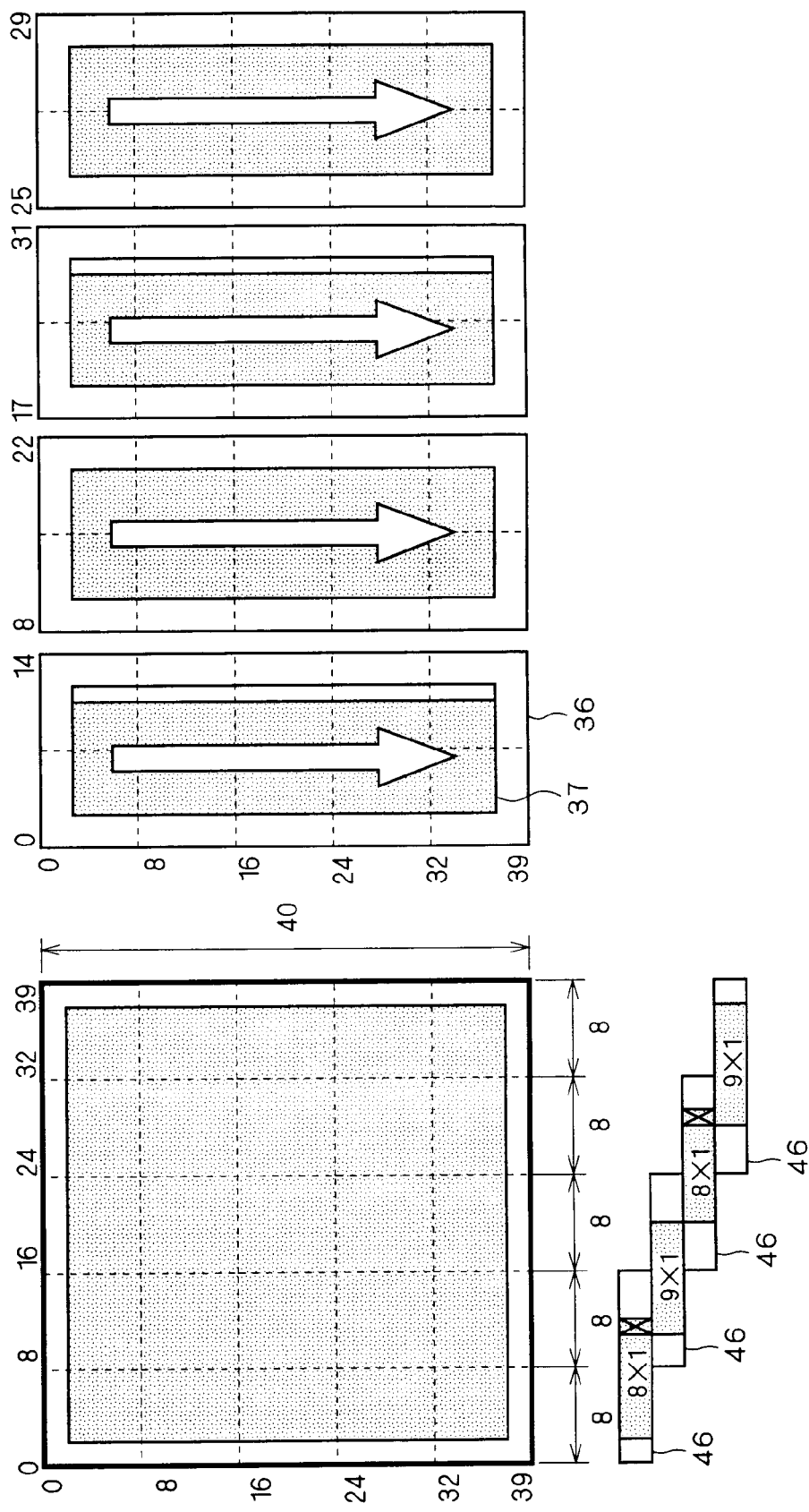

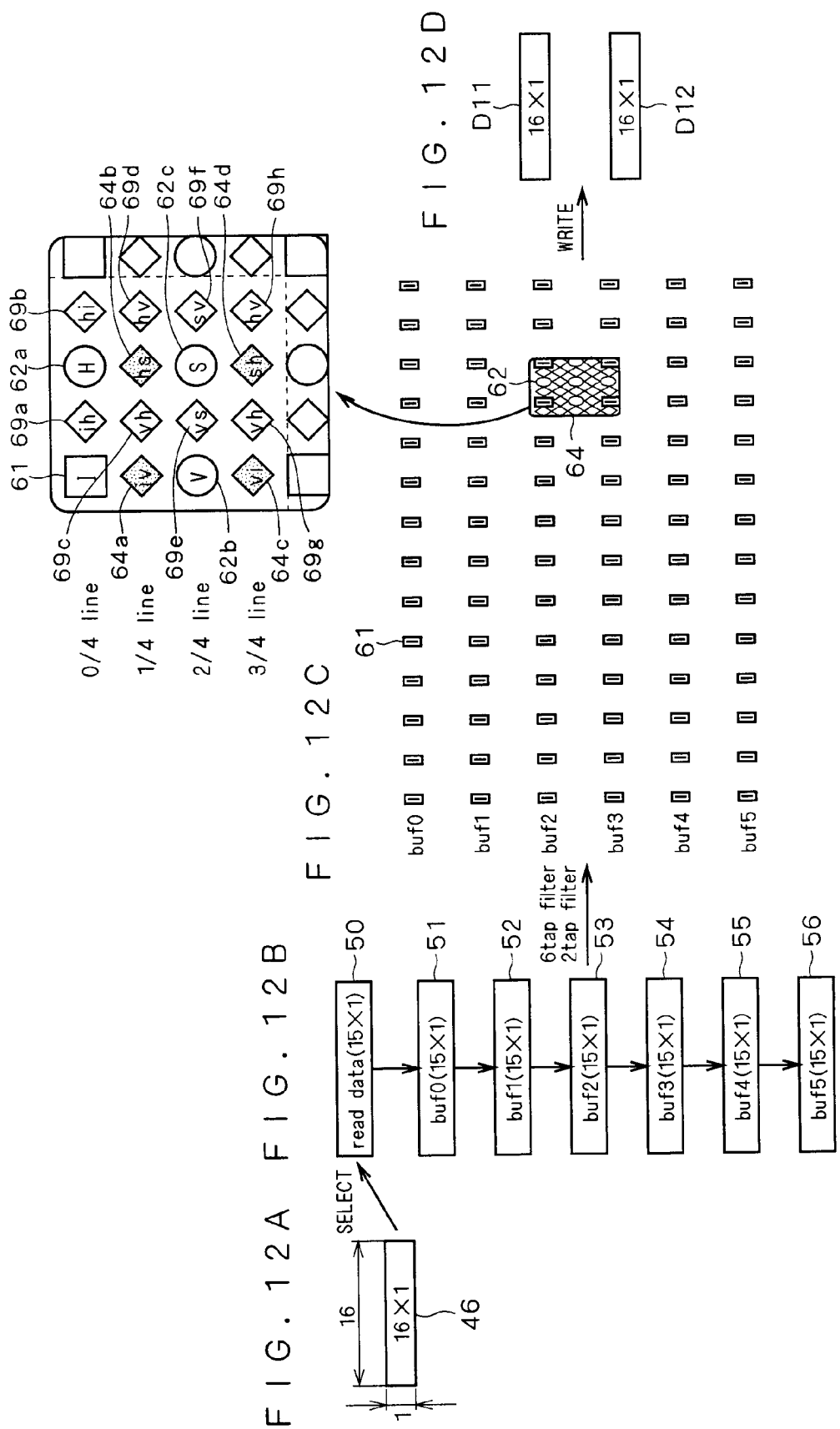

F I G . 1 3
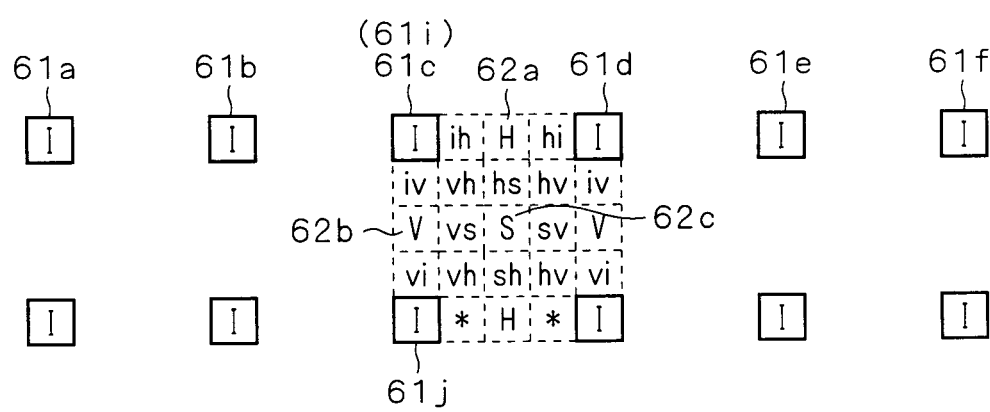

F I G. 1 4
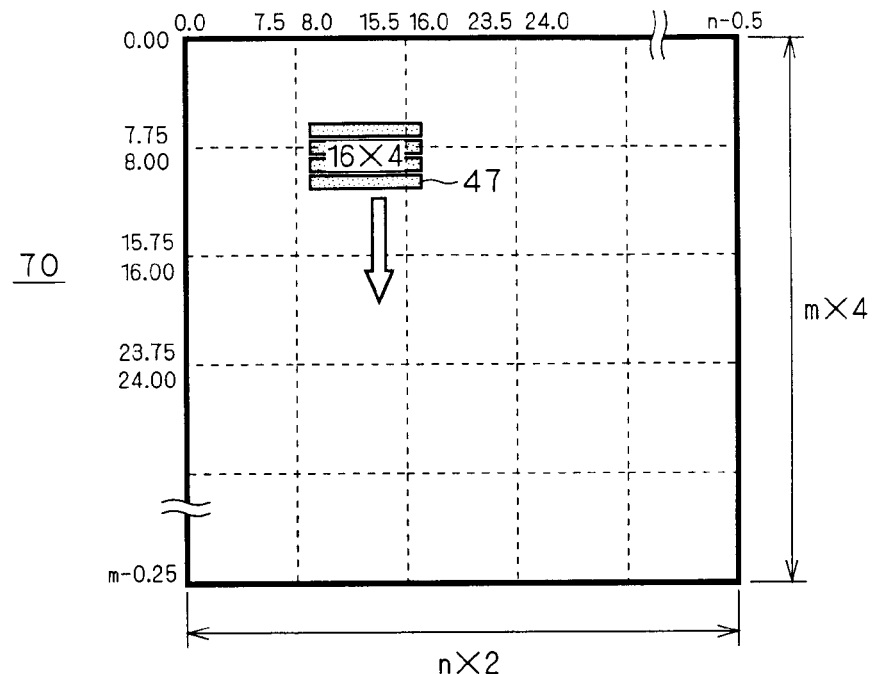
F I G. 1 5 A
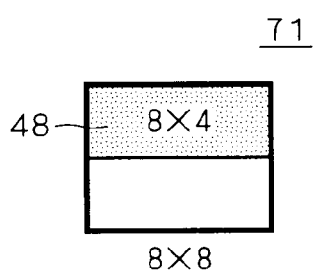
F I G. 1 5 C
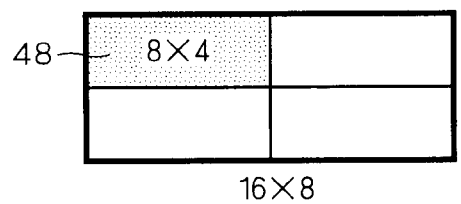
F I G. 1 5 B
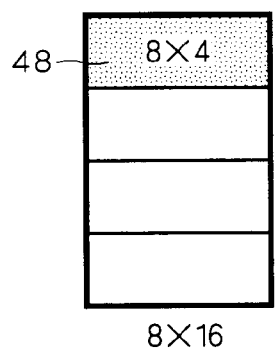
F I G. 1 5 D
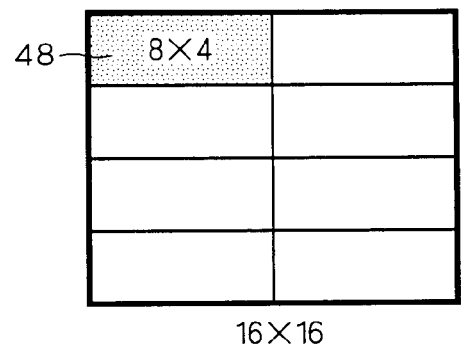

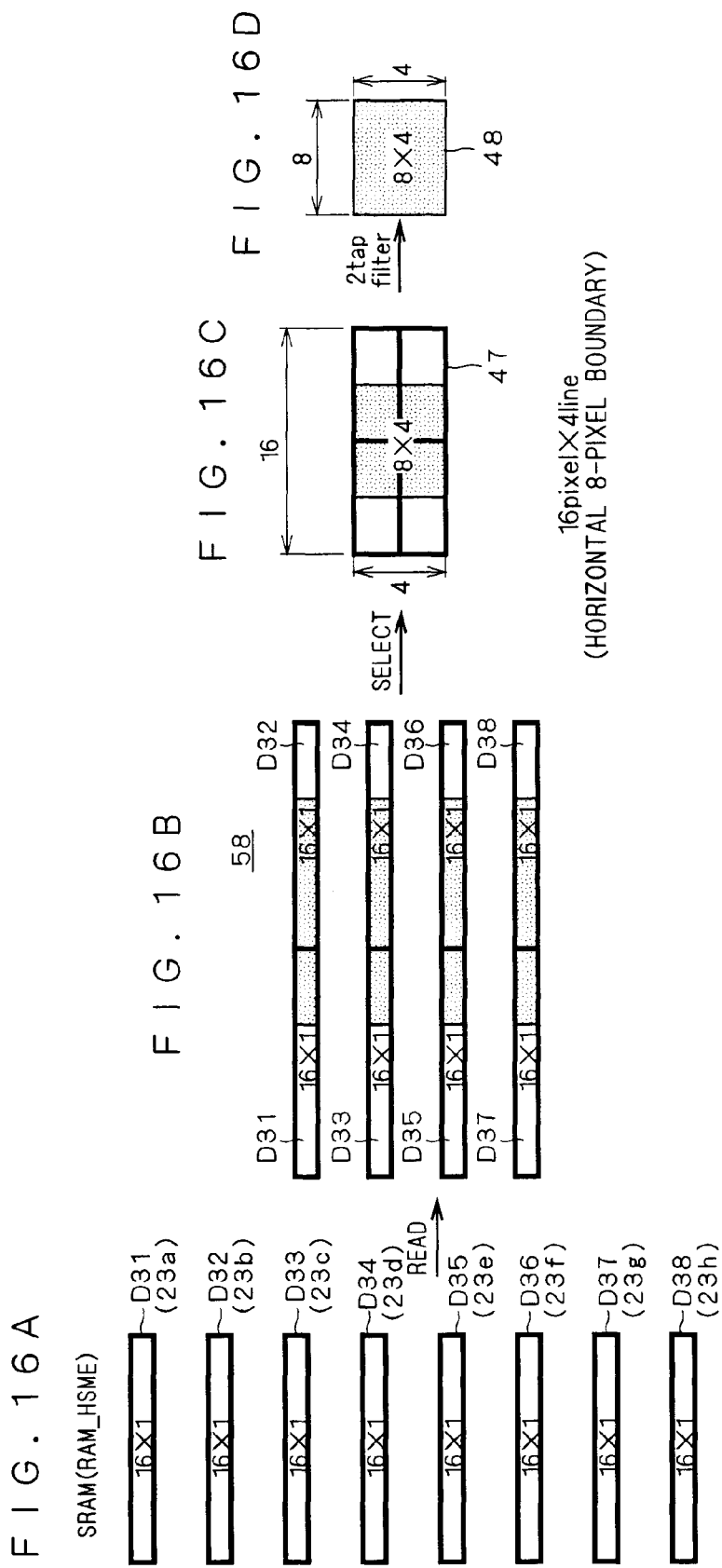

FIG. 17

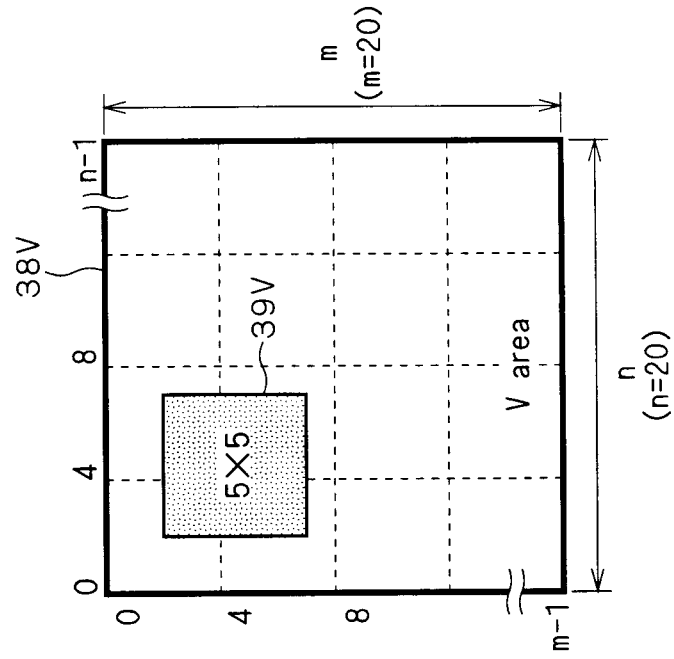
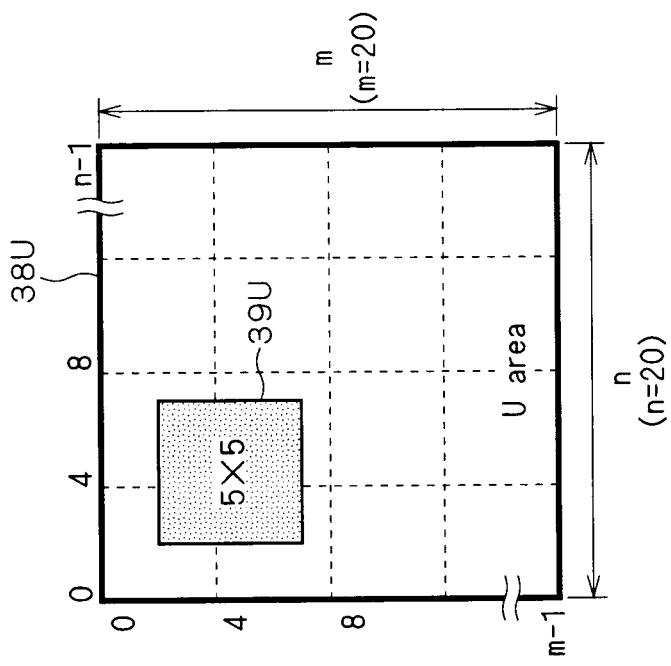

FIG. 19A

| | 0 | | | | | | | |
|---|---|---|---|---|---|---|---|---|
| 0 | V:line0 | V:line1 | V:line2 | V:line3 | V:line4 | V:line5 | V:line6 | V:line7 |
| | | | | | | | | |
| 4 | | | | | | | | |
| | | | | | | | | |
| 8 | | | | | | | | |
| 7 | U:line0 | U:line1 | U:line2 | U:line3 | U:line4 | U:line5 | U:line6 | U:line7 |
| (m−1) | V:line(m−1) | | | | | | | U:line(m−1) | area(0)

FIG. 19B

| | 4 | |
|---|---|---|
| 4 | V:line0 | U:line0 |
| | V:line1 | U:line1 |
| | V:line2 | U:line2 |
| | V:line3 | U:line3 |
| | ... | ... |
| 11 | | |
| | V:line(m−1) | U:line(m−1) | area(1)

FIG. 19C

| | 8 | |
|---|---|---|
| 8 | V:line0 | U:line0 |
| | V:line1 | U:line1 |
| | V:line2 | U:line2 |
| | V:line3 | U:line3 |
| | ... | ... |
| 15 | | |
| | V:line(m−1) | U:line(m−1) | area(2)

FIG. 19D

| | k×4 | k×4+7 |
|---|---|---|
| k×4 | V:line0 | U:line0 |
| | V:line1 | U:line1 |
| | V:line2 | U:line2 |
| | V:line3 | U:line3 |
| | ... | ... |
| k×4+7 | | |
| | V:line(m−1) | U:line(m−1) | area(k) (k=4)

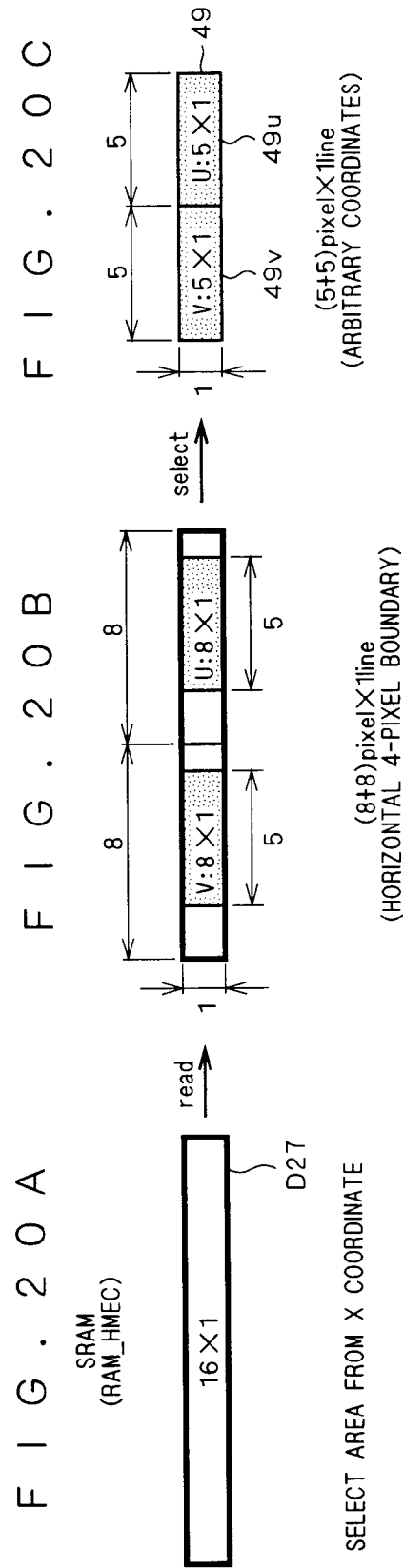

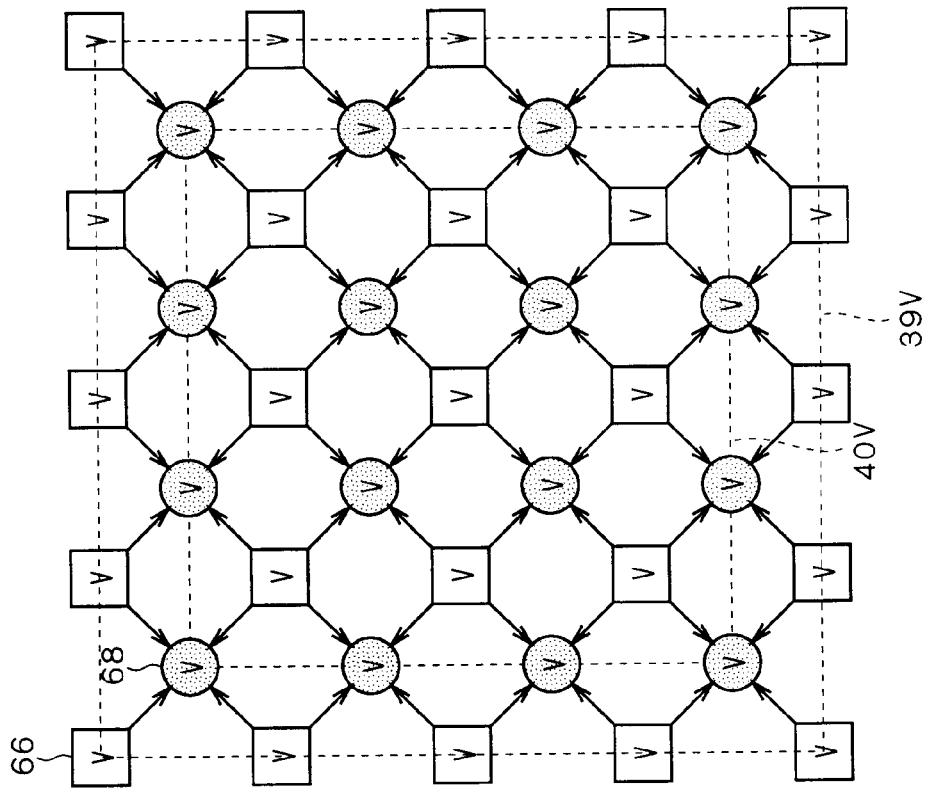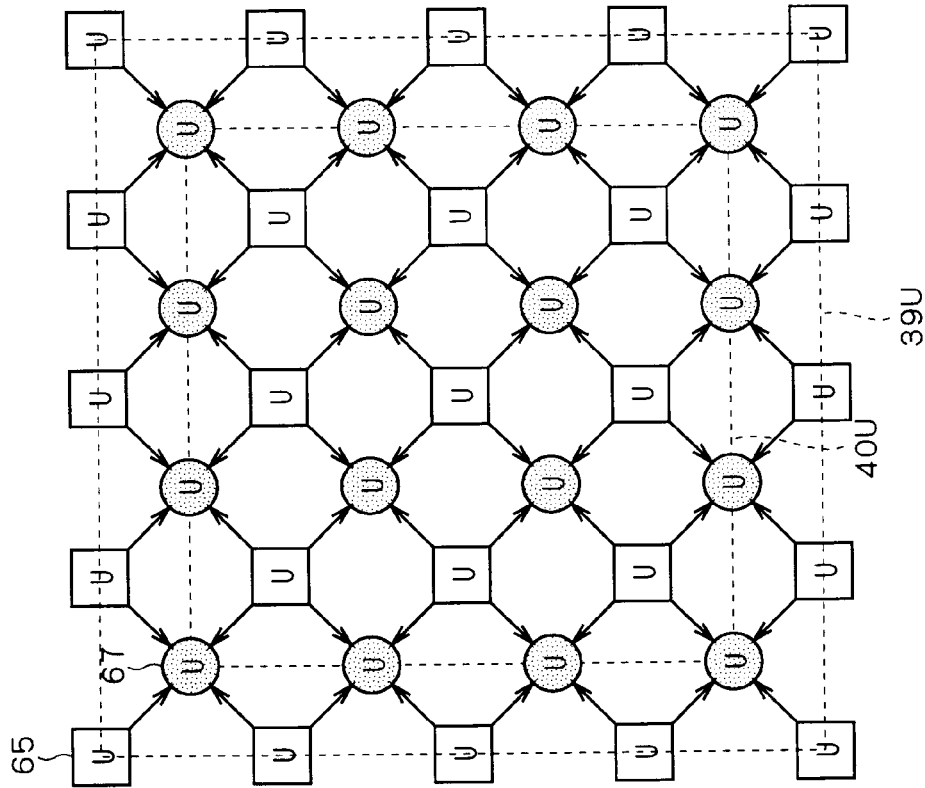

8×8

8×16

16×8

16×16

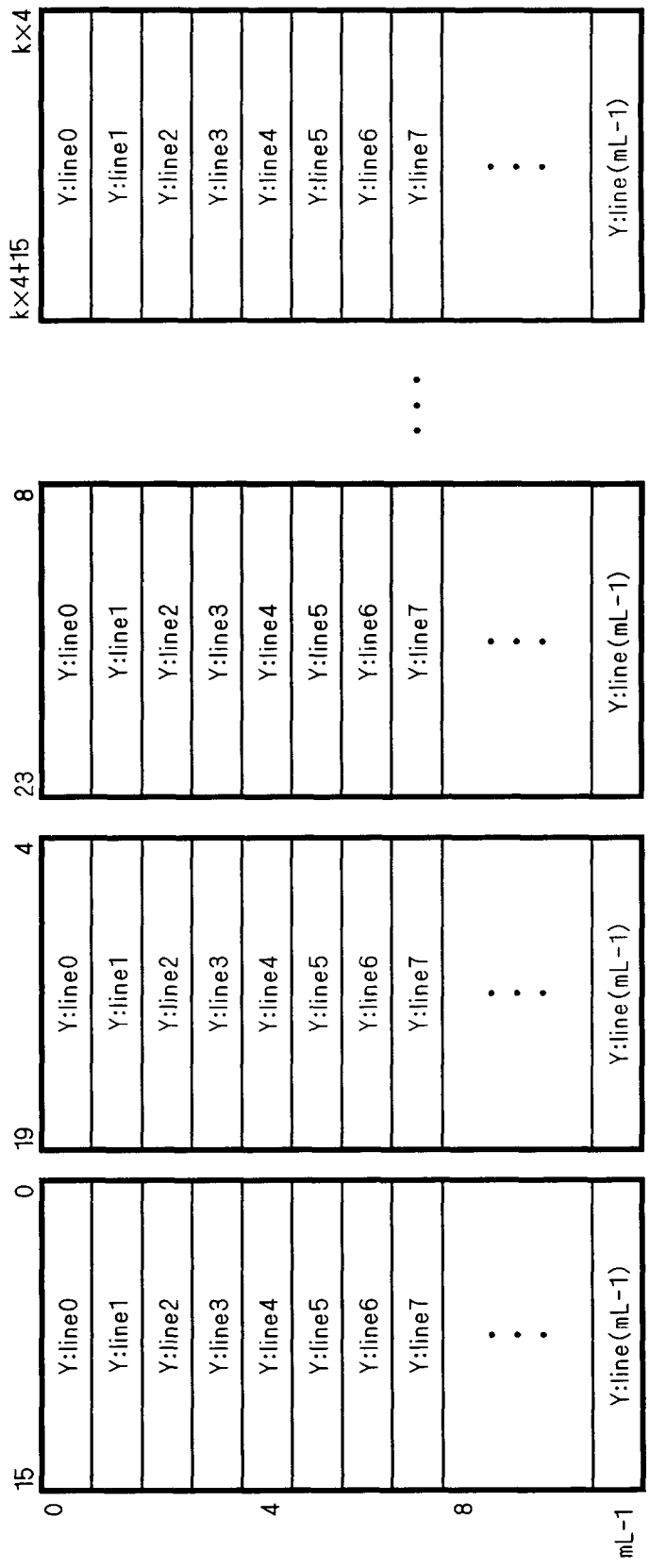

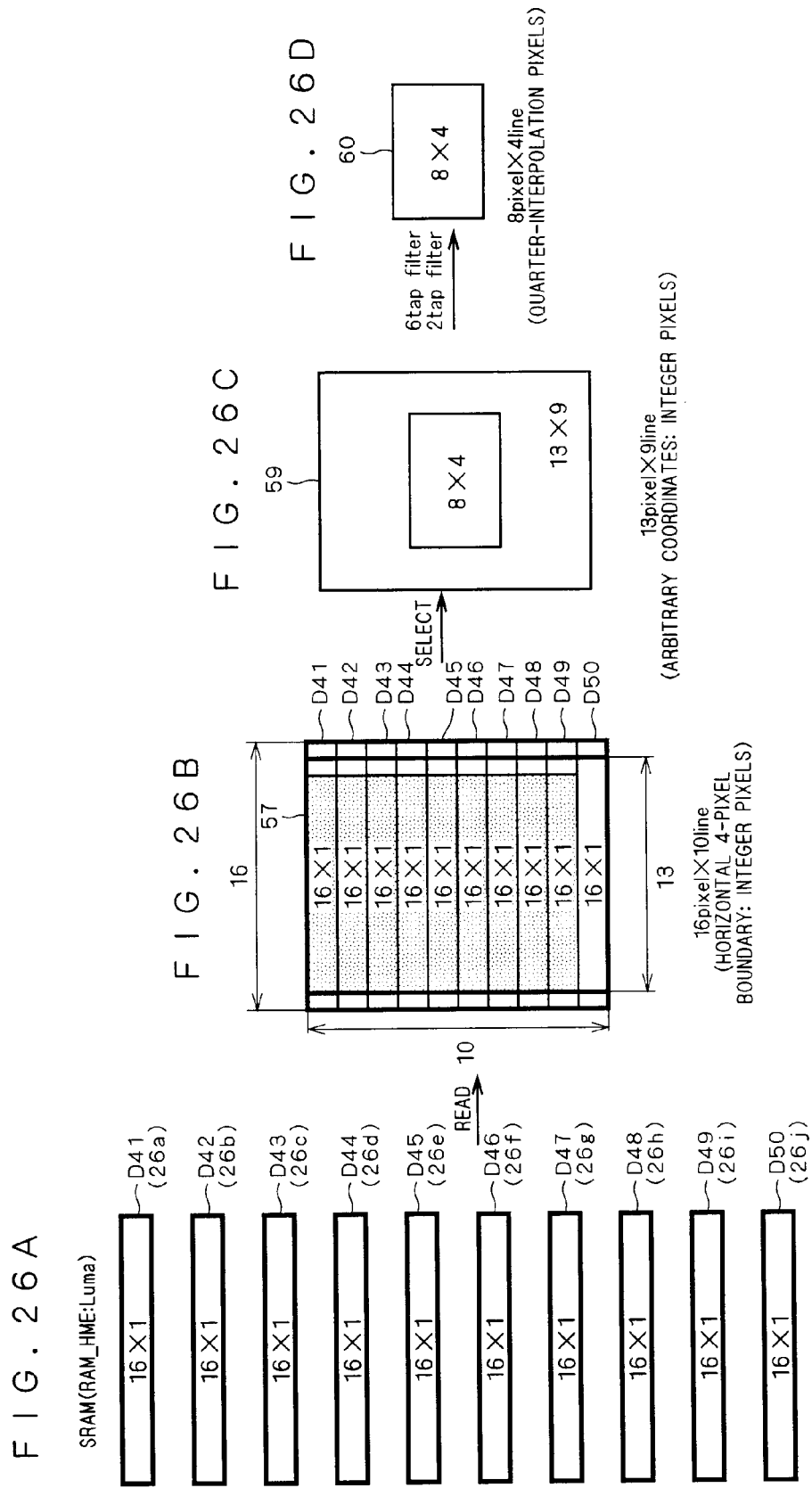

FIG. 27

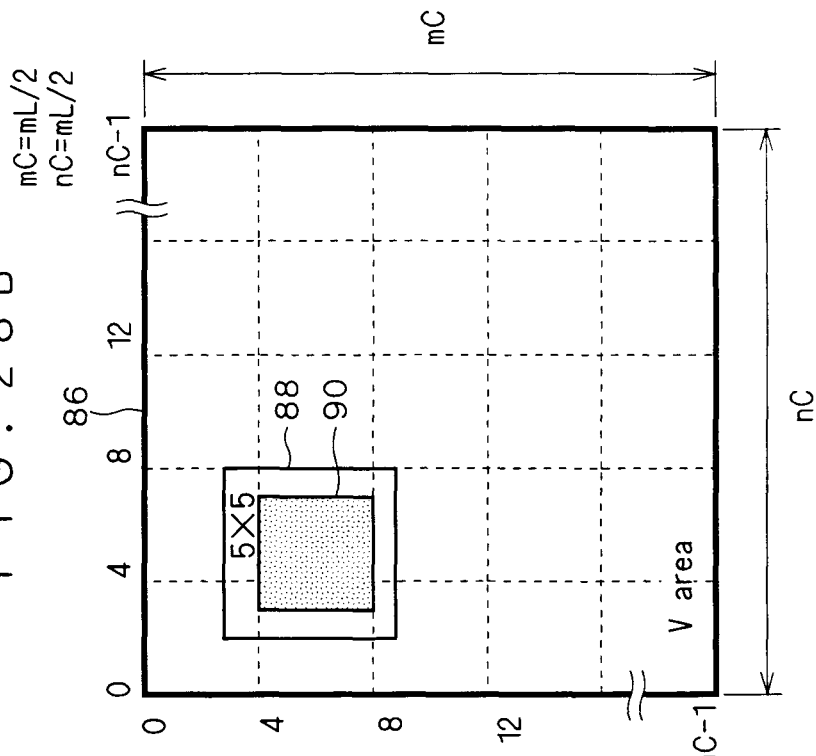
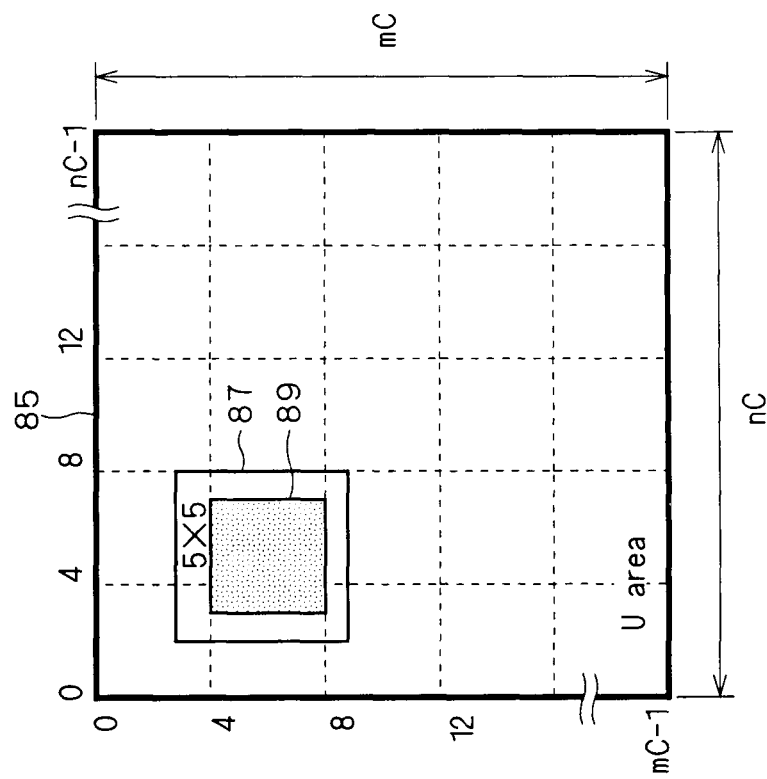

FIG. 29A

|  | 15 0 | 15 0 |
|---|---|---|
| 0 | V:line0 | U:line0 |
| 1 | V:line1 | U:line1 |
| 2 | V:line2 | U:line2 |
| 3 | V:line3 | U:line3 |
| ⋮ | ⋮ | ⋮ |
| mC-1 | V:line(mC-1) | U:line(mC-1) | areaC(0)

FIG. 29B

|  | k×16+15  k×16 | k×16+15  k×16 |
|---|---|---|
| 0 | V:line0 | U:line0 |
| 1 | V:line1 | U:line1 |
| 2 | V:line2 | U:line2 |
| 3 | V:line3 | U:line3 |
| ⋮ | ⋮ | ⋮ |
| mC-1 | V:line(mC-1) | U:line(mC-1) | areaC(k)(k=0)

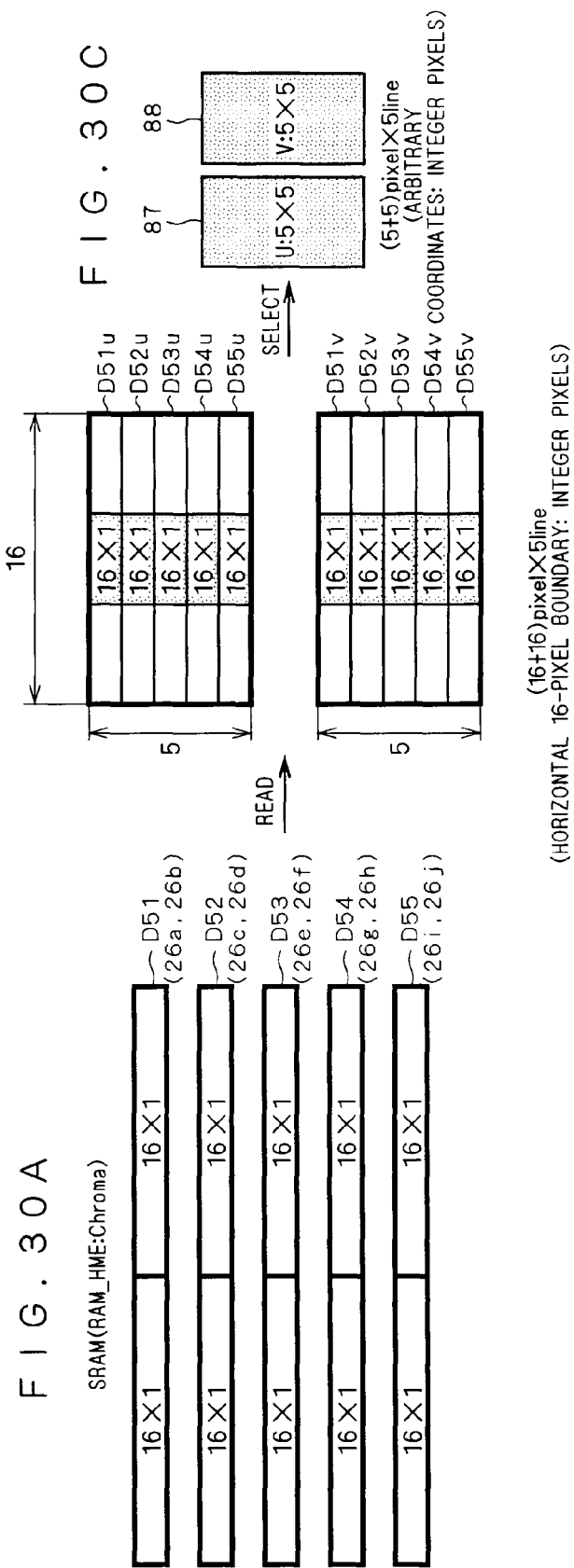

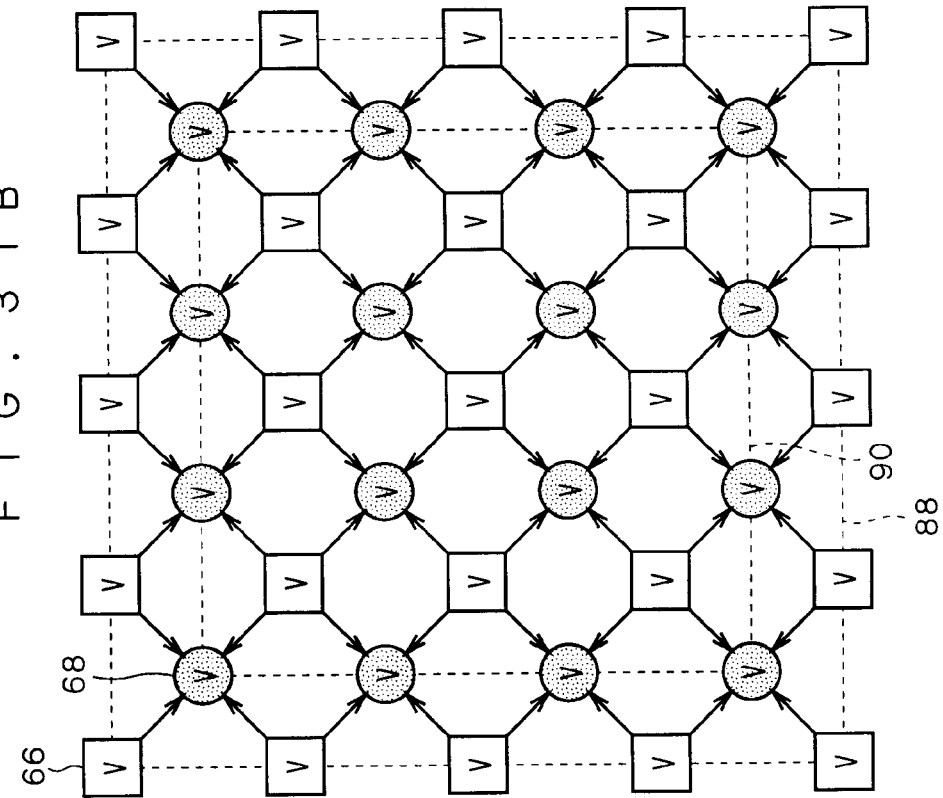
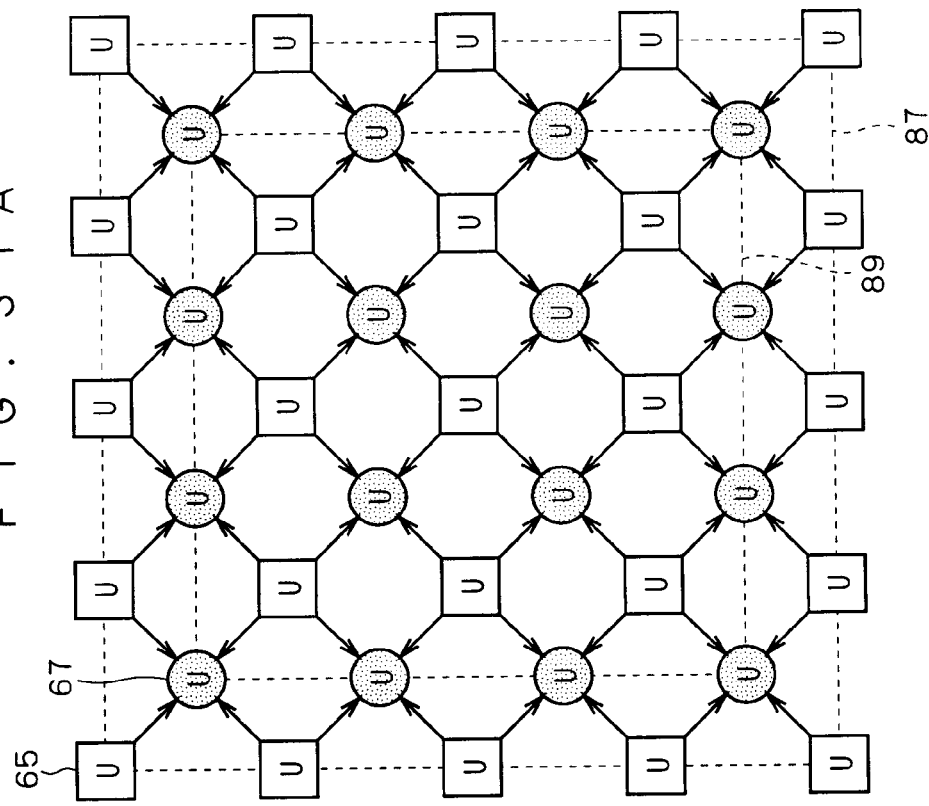

INTEGER PIXEL MOTION ESTIMATION SYSTEM, MOTION ESTIMATION SYSTEM FOR QUARTER-PIXEL LUMINANCE, MOTION ESTIMATION SYSTEM FOR QUARTER-PIXEL CHROMINANCE, MOTION ESTIMATION SYSTEM FOR COMBINED LUMINANCE, MOTION ESTIMATION SYSTEM FOR COMBINED LUMINANCE AND CHROMINANCE, AND MOTION ESTIMATION SYSTEM FOR QUARTER-PIXEL LUMINANCE AND CHROMINANCE

BACKGROUND OF THE INVENTION

1. Field of the Invention

The present invention relates to motion estimation systems that estimate motion of a moving image, and more specifically to a method of extracting an image in the course of motion estimation.

2. Description of the Background Art

As the latest international standard for moving image coding, H.264 was developed and has been put to practical use by the VCEG (Video Coding Experts Group) of the ITU-T (International Telecommunication Union Telecommunication Standardization Sector), an international standardization organization for telecommunications, together with the ISO/IEC MPEG (Moving Picture Experts Group).

H.264 achieves compression twice as efficiently as MPEG-2 or MPEG-4 with the same image quality, and is fit for a wide range of uses from a videoconference at low bit rates to HDTV (High Definition TeleVision).

In an H.264 encoder, image data is transferred for motion estimation among a ME (Motion Estimation) system, a MC (Motion Compensation) system, and a frame memory. A memory capable of performing moving image compression efficiently with small frame memory capacitance is disclosed in Japanese Patent Application Laid-Open No. 2004-222262, for example.

In Japanese Patent Application Laid-Open No. 2004-222262, improvements are made mainly to a frame memory, and not to an internal memory used in a motion estimation system. Thus high-speed motion estimation cannot be performed with a motion estimation system having a relatively simple circuit structure.

SUMMARY OF THE INVENTION

The present invention has been made to solve the aforementioned problem, and has an object to provide a motion estimation system capable of performing motion estimation at high speed while simplifying the circuit structure.

According to a first aspect of the invention, a motion estimation system includes: a prescribed number of storage sections for an integer pixel search that divide luminance data of integer-pixel accuracy in a prescribed image area and store the luminance data by prescribed unit as stored luminance data; and an integer pixel motion estimation section that extracts a prescribed reference extracted area based on a combination of the stored luminance data read from the prescribed number of storage sections for an integer pixel search, to perform motion estimation with integer-pixel accuracy, wherein in the prescribed number of storage sections for an integer pixel search, the stored luminance data corresponding to pixels adjacent in a horizontal direction and a vertical direction and four consecutive the stored luminance data corresponding to pixels adjacent in the horizontal direction are stored to vary among the prescribed number of storage sections for an integer pixel search.

The motion estimation system can efficiently read the prescribed reference extracted area, which is extracted based on a combination of the prescribed number of stored luminance data read from the prescribed number of storage sections for an integer pixel search, at an arbitrary position in the prescribed image area.

The improved efficiency of the extraction process of the prescribed reference extracted area allows the integer pixel motion estimation section to perform motion estimation of integer-pixel accuracy at high speed. Further, the improved efficiency reduces the load of doing calculations by the storage sections for an integer pixel search, thereby simplifying the circuit structure.

According to a second aspect of the invention, a motion estimation system for quarter-pixel luminance includes: a temporary storage section for luminance that stores luminance data of integer-pixel accuracy in a prescribed image area; a quarter-pixel generation section for luminance that performs a horizontal-direction interpolation process and a vertical-direction interpolation process based on the luminance data read from the temporary storage section for luminance to generate partial quarter-pixel luminance data, the partially quarter-pixel luminance data being luminance data of quarter-pixel accuracy only in one direction of the horizontal direction and vertical direction; a prescribed number of storage sections for a quarter-pixel search that divide the partial quarter-pixel luminance data and store the partial quarter pixel luminance data by prescribed unit as stored quarter-pixel luminance data; and a quarter-pixel motion estimation section that performs a prescribed calculation process based on a combination of the stored quarter-pixel luminance data read from the prescribed number of storage sections for a quarter-pixel search, to obtain a prescribed reference area after luminance calculation with quarter-pixel accuracy in both of the horizontal direction and vertical direction and perform motion estimation with quarter-pixel accuracy, the prescribed calculation process including an interpolation process in the other direction than the one direction to calculate luminance data of quarter-pixel accuracy in the other direction, wherein in the prescribed number of storage sections for a quarter-pixel search, the stored quarter-pixel luminance data corresponding to pixels adjacent in the other direction and four consecutive the stored quarter-pixel luminance data corresponding to pixels adjacent in units of integer pixels in the one direction are stored to vary among the prescribed number of storage sections for a quarter-pixel search.

The motion estimation system for quarter-pixel luminance can efficiently obtain the prescribed reference area after luminance calculation, which is obtained by a prescribed calculation process based on a combination of the prescribed number of stored quarter-pixel luminance data read from the prescribed number of storage sections for a quarter-pixel search, at an arbitrary position in the prescribed image area.

The improved efficiency in obtaining the prescribed reference area after luminance calculation allows the quarter-pixel motion estimation section to perform motion estimation of quarter-pixel accuracy at high speed. Further, the improved efficiency reduces the load of doing calculations by the quarter-pixel motion estimation section, thereby simplifying the circuit structure.

According to a third aspect of the invention, a motion estimation system for quarter-pixel chrominance includes: a prescribed number of storage sections for a chrominance that divide chrominance data of integer-pixel accuracy in a prescribed image area and store the data in units of stored chrominance data; and a quarter-pixel generation section for chrominance that performs a calculation process based on reference position information of quarter-pixel accuracy in accordance with a combination of the stored chrominance data read from the prescribed number of storage sections for a chrominance, to generate a prescribed reference area after chrominance calculation of quarter-pixel accuracy as estimation result chrominance data, wherein in the prescribed number of storage sections for a chrominance, the stored chrominance data corresponding to pixels adjacent in a horizontal direction are stored by being superimposed in units of a first number of pixels, and a second number of consecutive the stored chrominance data corresponding to pixels adjacent in a vertical direction are stored to vary among the prescribed number of storage sections for a chrominance.

The motion estimation system for quarter-pixel chrominance can efficiently obtain the reference area after chrominance calculation, which is obtained by calculation based on a combination of the stored chrominance data read from the prescribed number of storage sections for a chrominance, at an arbitrary position in the prescribed image area.

The improved efficiency in obtaining the reference area after chrominance calculation allows the quarter-pixel generation section for chrominance to perform motion estimation of quarter-pixel accuracy at high speed with respect to chrominance data. Further, the improved efficiency reduces the load of doing calculations by the quarter-pixel generation section for chrominance, thereby simplifying the circuit structure.

According to a fourth aspect of the invention a motion estimation system for combined luminance includes: the motion estimation system according to the first aspect; and the motion estimation system for quarter-pixel luminance according to the second aspect, wherein the integer pixel motion estimation section in the motion estimation system outputs a reference position signal of integer-pixel accuracy as a motion estimation result, and the quarter-pixel motion estimation section in the motion estimation system for quarter-pixel luminance performs motion estimation of quarter-pixel accuracy with a reference position instructed by the reference position signal as a base point.

Due to the combination of the motion estimation system according to the first aspect and the motion estimation system for quarter-pixel luminance according to the second aspect, the motion estimation system for combined luminance can perform motion estimation based on the luminance data of quarter-pixel accuracy at even higher speed while reducing the circuit structure.

According to a fifth aspect of the invention, a motion estimation system for combined luminance and chrominance includes: the motion estimation system according to the first aspect; the motion estimation system for quarter-pixel luminance according to the second aspect; and the motion estimation system for quarter-pixel chrominance according to the third aspect, wherein the integer pixel motion estimation section in the motion estimation system outputs a reference position signal of integer-pixel accuracy as a motion estimation result, the quarter-pixel motion estimation section in the motion estimation system for quarter-pixel luminance performs motion estimation of quarter-pixel accuracy with a reference position instructed by the reference position signal as a base point, to output estimation result luminance data of quarter-pixel accuracy, and the reference position information used by the motion estimation system for quarter-pixel chrominance includes reference position information on the estimation result luminance data of quarter-pixel accuracy.

Due to the combination of the motion estimation system according to the first aspect, the motion estimation system for quarter-pixel luminance according to the second aspect and the motion estimation system for quarter-pixel chrominance according to the third aspect, the motion estimation system for combined luminance and chrominance can perform motion estimation based on the luminance data and chrominance data of quarter-pixel accuracy at even higher speed while reducing the circuit structure.

According to a sixth aspect of the invention, a motion estimation system for quarter-pixel luminance and chrominance includes: a prescribed number of storage sections for a quarter-pixel search that divide luminance data and chrominance data of integer-pixel accuracy in a prescribed image area and store the luminance data and chrominance data by prescribed unit as stored luminance data and stored chrominance data, respectively; and a quarter-pixel motion estimation section that performs a prescribed calculation process based on a combination of the stored luminance data read from the prescribed number of storage sections for a quarter-pixel search, to obtain a prescribed reference area after luminance calculation with quarter-pixel accuracy in both a horizontal direction and a vertical direction and perform motion estimation thus obtaining estimation result luminance data, and generates a prescribed reference area after chrominance calculation of quarter-pixel accuracy as estimation result chrominance data based on a combination of the stored chrominance data read from the prescribed number of storage sections for a quarter-pixel search, the prescribed reference area after chrominance calculation corresponding to position information of quarter-pixel accuracy of the estimation result luminance data, wherein in the prescribed number of storage sections for a quarter-pixel search, the stored luminance data corresponding to pixels adjacent in the horizontal direction are stored by being superimposed in units of a first number of pixels, a second number of consecutive the stored luminance data corresponding to pixels adjacent in the vertical direction are stored to vary among the prescribed number of storage sections for a quarter-pixel search, and the stored chrominance data corresponding to pixels adjacent in the horizontal direction and a third number of consecutive the stored chrominance data corresponding to pixels adjacent in the vertical direction are stored to vary among the prescribed number of storage sections for a quarter-pixel search.

The motion estimation system for quarter-pixel luminance and chrominance can efficiently obtain the reference area after luminance calculation and the reference area after chrominance calculation, which are obtained by calculations based on combinations of the stored luminance data and stored chrominance data read from the prescribed number of storage sections for a quarter-pixel search, at an arbitrary position in the prescribed image area.

The improved efficiency in obtaining the reference area after luminance calculation and the reference area after chrominance calculation allows the motion estimation system for quarter-pixel luminance and chrominance to perform motion estimation of quarter-pixel accuracy at high speed. Further, the improved efficiency reduces the load of doing calculations by the quarter-pixel motion estimation section, thereby simplifying the circuit structure.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 4A to 4C illustrate a process of extracting an 8×4 extracted rectangular area;

FIGS. 5A and 5B are schematic diagrams of a specific storage example in the RAM_HIME;

FIGS. 6A to 6C illustrate a process of extracting a 16×2 extracted rectangular area;

FIG. 9 is a schematic diagram of an original image area stored in a RAM_HMEY shown in FIG. 1;

FIGS. 10A to 10C illustrate a process of extracting a 16×1 extracted rectangular area;

FIGS. 11A and 11B are schematic diagrams of integer pixel reading by a QPG shown in FIG. 1 in the course of a quarter-pixel generation process for luminance;

FIGS. 12A to 12D are schematic diagrams of processing contents of the QPG;

FIG. 13 illustrates an example of generating half-interpolation pixels;

FIG. 14 is a schematic diagram of an original pixel area stored in a RAM_HSME shown in FIG. 1;

FIGS. 15A to 15D illustrate examples of an obtained rectangular area of luminance data used for motion estimation;

FIGS. 16A to 16D illustrate a process of extracting an 8×4 extracted rectangular area;

FIG. 17 illustrates a method of calculating an extracted rectangular area by a SME shown in FIG. 1;

FIGS. 18A and 18B are schematic diagrams of original pixel areas stored in a RAM_HMEC shown in FIG. 1;

FIGS. 19A to 19D are schematic diagrams of storage areas of the RAM_HMEC;

FIGS. 20A to 20C illustrate a process of extracting a 5×5 extracted rectangular area;

FIGS. 21A and 21B are schematic diagrams of a bi-linear filter process by the QPG;

FIGS. 25A to 25D are schematic diagrams of luminance data storage areas of the RAM_HME;

FIGS. 26A to 26D illustrate a process of extracting an 8×4 extracted rectangular area;

FIG. 27 illustrates a process of calculating an 8×4 extracted rectangular area of quarter-pixel accuracy by a ME shown in FIG. 22;

FIGS. 28A and 28B are schematic diagrams of original pixel areas for U pixels and V pixels stored in the RAM_HME;

FIGS. 29A and 29B are schematic diagrams of chrominance data storage areas of the RAM_HME;

FIGS. 30A to 30C illustrate a process of extracting 5×5 extracted rectangular areas; and FIGS. 31A and 31B are schematic diagrams of a bi-linear filter process by the ME.

DESCRIPTION OF THE PREFERRED EMBODIMENTS

<First Preferred Embodiment>
(Overall Structure)

Figure 1:
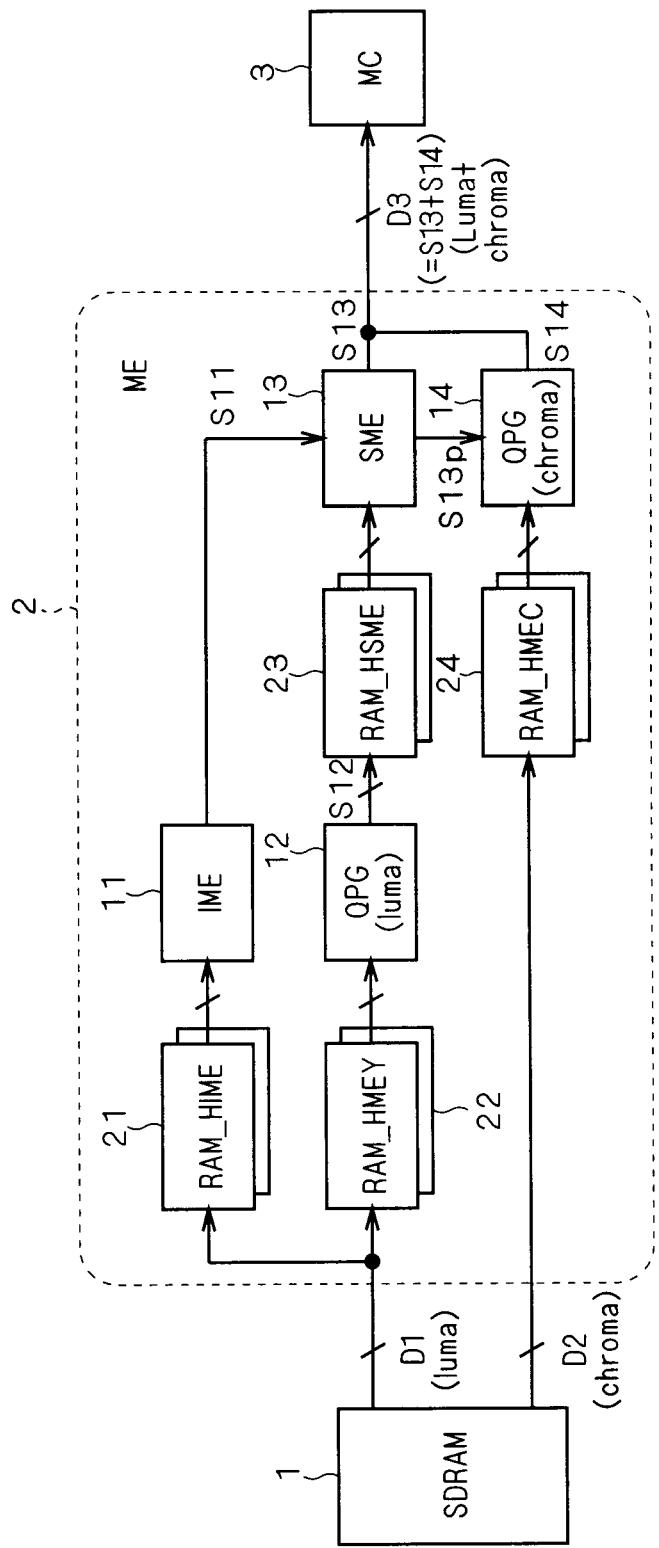
FIG. 1 is a block diagram of a motion estimation system and its peripheral structure according to a first preferred embodiment of the present invention.

FIG. 1 is a block diagram of a motion estimation system and its peripheral structure according to a first preferred embodiment of the present invention. As shown, a ME 2, a motion estimation system for combined luminance and chrominance, receives luminance data D1 and chrominance data D2 from a SDRAM 1, to output luminance and chrominance data D3 as a motion estimation result to a MC 3. In an H.264 encoder, the SDRAM 1 corresponds to a frame memory, the ME 2 to a motion estimation system, and the MC 3 to a motion compensation system.

The ME 2 includes a RAM_HIME (H.264 integer pel motion estimation) 21, a RAM_HMEY (H.264 motion estimationY) 22, a RAM_HSME (H.264 sub-pel motion estimation) 23, a RAM_HMEC (H.264 motion estimation chroma) 24, an IME (integer pel motion estimation) 11, a QPG (quarter-pixel generator) 12, a SME (sub-pel motion estimation) 13, and a QPG 14.

The SDRAM 1 stores the luminance data D1 and the chrominance data D2 of integer-pixel accuracy. The RAM_HIME 21, an integer pixel motion estimation SRAM with respect to luminance data (storage section for an integer pixel search), stores the integer pixel luminance data D1 from the SDRAM 1 while satisfying the conditions described later. The IME 11, an integer pixel motion estimation section with respect to luminance data, performs an integer pixel search process to make estimation with integer-pixel accuracy by using the luminance data D1 stored in the RAM_HIME 21, to output a reference position signal S11 indicative of a reference position of estimation result luminance data to the SME 13.

The RAM_HMEY 22, an integer pixel storage SRAM for a quarter-pixel search with respect to luminance data (temporary storage section for luminance), stores the luminance data D1 from the SDRAM 1 while satisfying the conditions described later. The QPG 12, a quarter-pixel generation section for luminance, performs a quarter-pixel generation process for luminance described later by using the luminance data D1 stored in the RAM_HMEY 22, to output partial quarter-pixel luminance data S12 in which integer pixel data is added with (horizontal direction, vertical direction, oblique direction) half-pixel data and (vertical direction) quarter-pixel data to the RAM_HSME 23.

The RAM_HSME 23, a partial quarter-pixel storage SRAM (storage section for a quarter-pixel search), stores the partial quarter-pixel luminance data S12 while satisfying the conditions described later. The SME 13, a quarter-pixel motion estimation section with respect to luminance data, conducts a pixel search of quarter-pixel accuracy in a range of {−0.75~+0.75} in a horizontal direction and a vertical direction from the reference position instructed by the reference position signal S11. Namely, the SME 13 performs a quarter-pixel search process described later by using the partial quarter-pixel luminance data S12 stored in the RAM_HSME 23 to output luminance data S13 indicative of a quarter-pixel search result (estimation result luminance data), and outputs a reference position signal S13*p* instructing a quarter-pixel reference position of the luminance data S13 (reference position information) to the QPG 14.

The RAM_HMEC 24, a motion estimation SRAM with respect to chrominance data (storage section for a chrominance), stores the integer pixel chrominance data D2 from the SDRAM 1 while satisfying the conditions described later.

The QPG 14, a quarter-pixel generation section for chrominance, performs a quarter-pixel generation process for chrominance described later based on the reference position signal S13p by using the chrominance data D2 stored in the RAM_HMEC 24, to generate chrominance data S14 (estimation result chrominance data) of quarter-pixel accuracy corresponding to the luminance data S13. The luminance data S13 and the chrominance data S14 form the luminance and chrominance data D3.

(Integer Pixel Motion Estimation System with Respect to Luminance Data)

The RAM_HIME 21 and the IME 11 shown in FIG. 1 form an integer pixel motion estimation system with respect to luminance data.

(RAM_HIME 21, IME 11)

Figure 2:
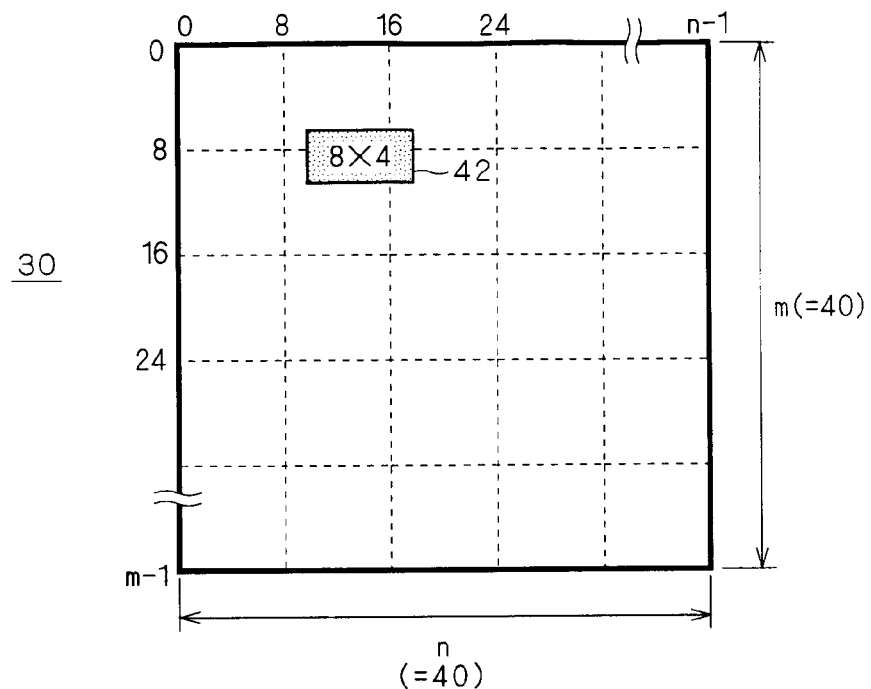
FIG. 2 is a schematic diagram of an original image area stored in a RAM_HIME shown in FIG. 1.

FIG. 2 is a schematic diagram of an original image area 30 stored in the RAM_HIME 21. In the diagram, the n (pixel)×m (line) original image area 30 (prescribed image area) stores an arbitrary 8 (pixel)×4 (line) extracted rectangular area 42 (prescribed reference extracted area) in an extractable manner. FIG. 2 is an illustration where n=40 and m=40.

Figure 3A:
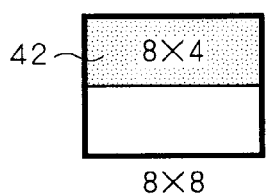
FIGS. 3A to 3D illustrate examples of an obtained rectangular area of luminance data used for motion estimation.
Figure 3B:
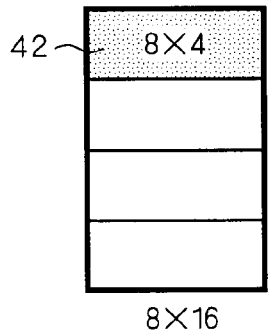
Figure 3C:
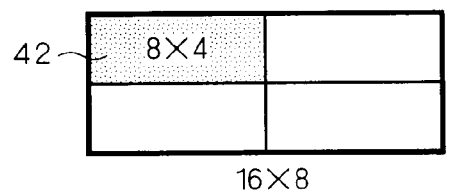
Figure 3D:
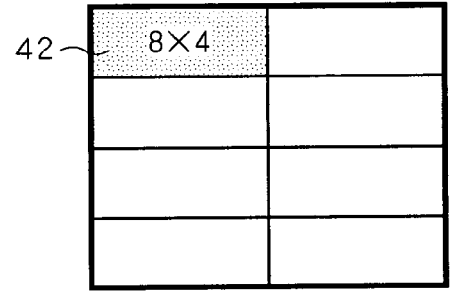

FIGS. 3A to 3D illustrate examples of an obtained rectangular area of integer-pixel (position) accuracy of luminance data used for motion estimation. An 8×8 rectangular area 31 can be obtained from two 8×4 extracted rectangular areas 42 as shown in FIG. 3A, or an 8×16 rectangular area 32 can be obtained from four extracted rectangular areas 42 as shown in FIG. 3B, or a 16×8 rectangular area 33 can be obtained from four extracted rectangular areas 42 as shown in FIG. 3C, or a 16×16 rectangular area 34 can be obtained from eight extracted rectangular areas 42 as shown in FIG. 3D.

The RAM_HIME 21 includes four RAM_HIMEs 21a to 21d, and stores the luminance data D1 while satisfying the conditions indicated below. The premise is that the luminance data D1 is read from the SDRAM 1 in units of 8 (pixel)×2 (line). For the purpose of illustration, one of the RAM_HIMEs 21a to 21d will hereafter be indicated as a RAM_HIME 21x.

(1) A storage unit of stored luminance data per address of the RAM_HIME 21x is 8×2.

(2) The 8×2 stored luminance data corresponding to pixels adjacent in vertical and horizontal directions are stored to vary among the RAM_HIMEs 21a to 21d.

(3) Four consecutive 8×2 stored luminance data corresponding to pixels adjacent in a horizontal direction are stored to vary among the RAM_HIMEs 21a to 21d.

(4) Reading is performed after all data of the original image area 30 are stored in the RAM_HIMEs 21a to 21d from the SDRAM 1.

(5) Reading is performed simultaneously from the four RAM_HIMEs 21a to 21d, to obtain a 16×4 or 32×2 read rectangular area in one cycle (by one reading).

(6) For the 16×4 read rectangular area, an 8×4 rectangular area is extracted as an extracted rectangular area.

(7) For the 32×2 read rectangular area, a 16×2 rectangular area is extracted as an extracted rectangular area.

FIGS. 4A to 4C illustrate a process of extracting an 8×4 extracted rectangular area. As shown in FIG. 4A, read luminance data D21 to D24 are obtained from the RAM_HIMEs 21a to 21d. Then as shown in FIG. 4B, a 16×4 read rectangular area 41 can be obtained from the read luminance data D21 to D24 to satisfy the above condition (2). Then as shown in FIG. 4C, an arbitrary 8×4 rectangular area in the read rectangular area 41 can be extracted as the extracted rectangular area 42.

FIGS. 5A and 5B are schematic diagrams of a specific storage example in the RAM_HIME 21x. In the diagrams, "i" of luminance data "Yij_k" indicates a horizontal position in units of 8 pixels, "j" indicates a vertical position in units of 8 lines, and "k" indicates a line position in units of 2 lines. As shown in FIG. 5A, the original image area 30 has a 40×40 integer pixel area. Meanwhile, as shown in FIG. 5B, the luminance data D1 is stored to be distributed among the RAM_HIMEs 21a to 21d so that the RAM_HIMEs 21a to 21d store the luminance data in units of 8×2 per address, and a 16×4 or 32×2 rectangular area can be extracted in units of 8×2 by one reading operation from the original image area 30 by satisfying the above conditions (2) and (3). Since 8 bits are allocated per pixel, 128-bit (=8×8×2) capacitance is allocated per address as shown in FIG. 5B.

By way of example, assume that the read rectangular area 41 (Y10_3, Y20_3, Y11_0, Y21_0) is selected to obtain the extracted rectangular area 42 as shown in FIG. 5A. As the RAM_HIME 21a stores "Y20_3" at an address number 11, the RAM_HIME 21b stores "Y11_0" at an address number 2, the RAM_HIME 21c stores "Y21_0" at an address number 12, and the RAM_HIME 21d stores "Y10_3" at an address number 1, 8×2 luminance data at these addresses are read from the RAM_HIMEs 21a to 21d, to obtain the 16×4 read rectangular area 41. After that, the arbitrary 8×4 extracted rectangular area 42 can be extracted from the read rectangular area 41.

FIGS. 6A to 6C illustrate a process of extracting a 16×2 extracted rectangular area. As shown in FIG. 6A, the read luminance data D21 to D24 are obtained from the RAM_HIMEs 21a to 21d. Then as shown in FIG. 6B, a 32×2 read rectangular area 43 can be obtained from the read luminance data D21 to D24 to satisfy the above condition (3). Then as shown in FIG. 6C, an arbitrary 16×2 rectangular area in the read rectangular area 43 can be extracted as an extracted rectangular area 44.

Figure 7:
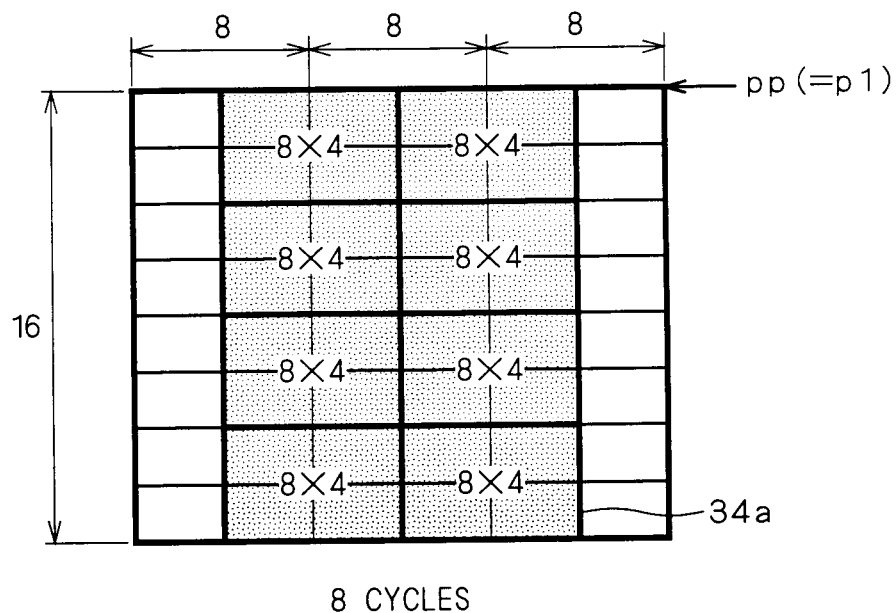
FIG. 7 is a schematic diagram of a (first) example of extracting a 16×16 macro block.

FIG. 7 is a schematic diagram of a (first) example of extracting a 16×16 macro block. The premise is that the extraction process of the extracted rectangular area 42 shown in FIG. 4C is referred to as a main extraction process, and the extraction process of the extracted rectangular area 44 shown in FIG. 6C as a sub-extraction process.

When a beginning line position pp of a rectangular area 34a matches with a first line-1 position p1 of two lines of luminance data stored at one address in the RAM_HIME 21x as shown in FIG. 7, the 16×16 rectangular area 34a can be obtained from eight extracted rectangular areas 42 without fail, and thus can be read in eight cycles by eight main extraction processes.

Figure 8:
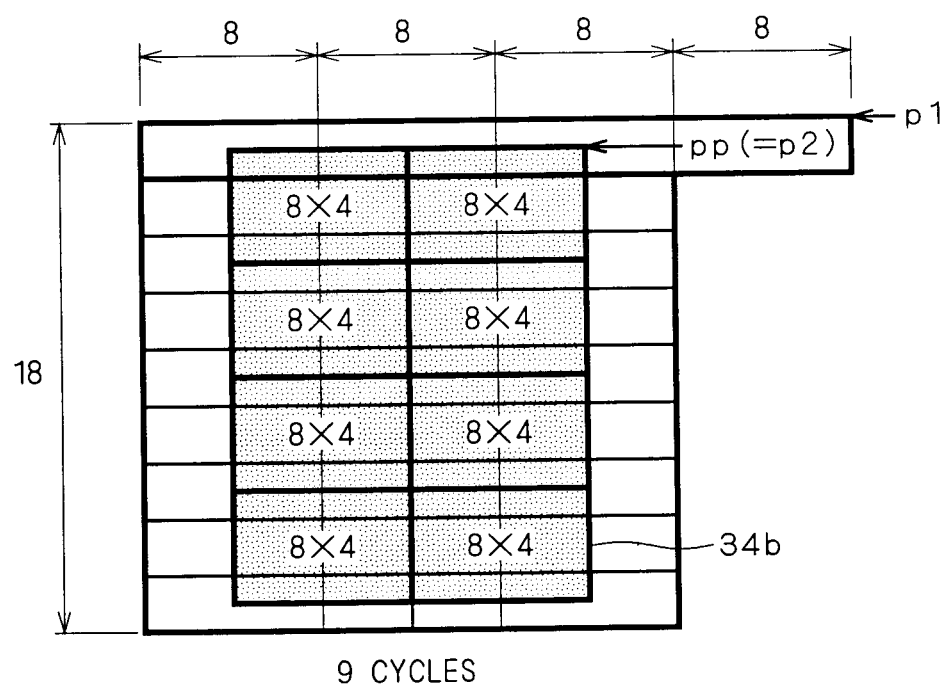
FIG. 8 is a schematic diagram of a (second) example of extracting a 16×16 macro block.

FIG. 8 is a schematic diagram of a (second) example of extracting a 16×16 macro block. When the beginning line position pp of a rectangular area 34b matches with a second line-1 position p2 of two lines of luminance data stored at one address in the RAM_HIME 21x as shown in FIG. 8, the 16×16 rectangular area 34b needs to be read in nine cycles by eight main extraction processes and one sub-extraction process.

In this manner an arbitrary 8×4 extracted rectangular area can be read in one to two cycles and a 16×16 macro block can be read in eight to nine cycles from the RAM_HIME 21x. The result is that the IME 11 in the subsequent stage reads the 16×16 macro block at high speed by changing the search pixel position in units of integers, thus performing motion estimation at high speed. The IME 11 performs the motion estimation itself by an existing method, and outputs the reference position signal S11 of integer-pixel accuracy which is the estimation result to the SME 13. The actual motion estimation itself, which is performed in units of 8×8 integer pixels in the 16×16 macro block, is not substantially relevant to the characteristics of the present invention and is thus not described in detail.

As described above, in the integer pixel motion estimation system with respect to luminance data including the RAM_HIME 21 and the IME 11, the four RAM_HIMEs 21a to 21d store the stored luminance data D1 while satisfying the above conditions (1) to (7).

Accordingly, the arbitrary extracted rectangular area 42 (44) in the original image area 30 can be extracted by the combination of the four read luminance data D21 to D24 read from the RAM_HIMEs 21a to 21d by one or two reading operations, with improved efficiency in reading the extracted rectangular area 42.

The improved efficiency of the extraction process of the extracted rectangular area 42 allows the IME 11 to perform motion estimation of integer-pixel accuracy at high speed. Further, the improvement in reading efficiency reduces the load of doing calculations by the IME 11, thereby simplifying the circuit structure.

(Motion Estimation System for Quarter-Pixel Luminance)

The RAM_HMEY 22, the QPG 12, the RAM_HSME 23, and the SME 13 shown in FIG. 1 form a motion estimation system for quarter-pixel luminance with respect to luminance data.

FIG. 9 is a schematic diagram of an original image area 35 stored in the RAM_HMEY 22. In the diagram, the n (pixel) ×m (line) original image area 35 stores an arbitrary 16 (pixel)×1 (line) extracted rectangular area 46 in an extractable manner. FIG. 9 is an illustration where n=40 and m=40.

The RAM_HMEY 22 serving as a temporary storage section for luminance includes two RAM_HMEYs 22a and 22b, and stores the luminance data D1 while satisfying the conditions indicated below. The premise is that the luminance data D1 is read from the SDRAM 1 in units of 8 (pixel)×2 (line). For the purpose of illustration, one of the RAM_HMEYs 22a and 22b will hereafter be indicated as a RAM_HMEY 22x.

(1) A storage unit of stored luminance data per address of the RAM_HMEY 22x is 16×1.

(2) The 8×2 luminance data read from the SDRAM 1 is divided into two 8×1 data and written simultaneously to the RAM_HMEYs 22a and 22b, respectively.

(3) The 16×1 stored luminance data corresponding to pixels adjacent in a horizontal direction are stored to vary between the RAM_HMEYs 22a and 22b.

(4) Reading is performed after all data of the original image area 35 are stored in the RAM_HMEYs 22a and 22b from the SDRAM 1.

(5) Reading is performed simultaneously from the two RAM_HMEYs 22a and 22b, to obtain a 32×1 read rectangular area in one cycle.

(6) For the 32×1 read rectangular area, a 16×1 rectangular area is extracted as an extracted rectangular area.

FIGS. 10A to 10C illustrate a process of extracting a 16×1 extracted rectangular area. As shown in FIG. 10A, read luminance data D25 and D26 are obtained from the RAM_HMEYs 22a and 22b. Then as shown in FIG. 10B, a 32×1 read rectangular area 45 can be obtained from the read luminance data D25 and D26 by one reading operation to satisfy the above condition (3). Then as shown in FIG. 10C, an arbitrary 16×1 rectangular area in the read rectangular area 45 can be extracted as the extracted rectangular area 46.

(Quarter-Pixel Generation Process for Luminance (QPG 12))

FIGS. 11A and 11B are schematic diagrams of integer pixel reading by the QPG 12 in the course of the quarter-pixel generation process for luminance. The QPG 12 reads integer pixels sequentially from 0 through 39 lines from the 40×40 original image area 35 stored in the RAM_HMEY 22 shown in FIG. 11A by shifting the horizontal position of the extracted rectangular area 46 in units of 8 or 9 pixels as shown in FIGS. 11A and 11B. The QPG 12 then generates the partial quarter-pixel luminance data S12 in which an integer pixel in a quarter-pixel generation area 37 is added with a half-interpolation pixel 62 and a quarter-interpolation pixel 64 in a vertical direction from a quarter-pixel calculation area 36.

FIGS. 12A to 12D are schematic diagrams of processing contents of the QPG 12. The luminance data of the 16×1 extracted rectangular area 46 shown in FIG. 12A extracted from the RAM_HMEY 22 is stored in a 15×1 lead register shown in FIG. 12B. Since the partial quarter-pixel luminance data S12 can be generated with 14 to 15 integer pixels in a horizontal direction, 15×1 pixel data in the 16×1 extracted rectangular area 46 is stored selectively in the lead register 50.

As shown in FIG. 12B, the data stored in the lead register 50 is shifted to a 15×1 line buffer 51 upon reading of luminance data of the newly extracted rectangular area 46, and subsequently shifted to 15×1 line buffers 52 to 56 in this order upon reading of luminance data of the newly extracted rectangular area 46. Six integer pixels adjacent in a vertical direction can thus be stored in the line buffers 51 to 56 (buf0 to buf5).

Then, one (horizontal direction) half-interpolation pixel 62a is obtained from 6 integer pixels 61 adjacent in a horizontal direction (6 tap filter), a (vertical direction) half-interpolation pixel 62b is obtained from 6 integer pixels 61 adjacent in a vertical direction (6 tap filter), and an (oblique direction) half-interpolation pixel 62c is obtained from 6 half-interpolation pixels 62a adjacent in a vertical direction (6 tap filter).

FIG. 13 illustrates an example of generating half-interpolation pixels by the "6 tap filter". As shown, one half-interpolation pixel 62a (H) can be obtained from 6 integer pixels 61a to 61f (I) adjacent in a horizontal direction, and one half-interpolation pixel 62b (V) can be obtained from 6 integer pixels 61g to 61l (I) adjacent in a vertical direction. Likewise, one half-interpolation pixel 62c (S) can be obtained from 6 half-interpolation pixels 62a (H) adjacent in a vertical direction.

Referring back to FIG. 12C, a quarter-interpolation pixel 64a (iv) or a quarter-interpolation pixel 64c (vi) is obtained from the integer pixel 61 (I) and the half-interpolation pixel 62b (V) adjacent in a vertical direction (2 tap filter), and a quarter-interpolation pixel 64b (hs) or a quarter-interpolation pixel 64d (sh) is obtained from the half-interpolation pixel 62a (H) and the half-interpolation pixel 62c (S) adjacent in a vertical direction. The QPG 12 does not generate quarter-interpolation pixels 69a to 69h in consideration of memory efficiency of the RAM_HSME 23 in the subsequent stage.

Consequently, the partial quarter-pixel luminance data S12 is generated in which 3 half-interpolation pixels 62a to 62c and 4 quarter-interpolation pixels 64a to 64d are added to one integer pixel 61.

Namely, 14 integer pixels 61 and 13 half-interpolation pixels 62a are obtained in a 0/4 line, 14 quarter-interpolation pixels 64a and 13 quarter-interpolation pixels 64b are obtained in a 1/4 line, 14 half-interpolation pixels 62b and 13 half-interpolation pixels 62c are obtained in a 2/4 line, and 14 quarter-interpolation pixels 64c and 13 quarter-interpolation pixels 64d are obtained in a 3/4 line.

In each of the 0/4 to 3/4 lines, 27 pixels of information is obtained by the 6 tap filter processes and 2 tap filter processes based on the stored data in the line buffers 51 to 56. However, since the half-interpolation pixel 62a, the quarter-interpolation pixel 64b, the half-interpolation pixel 62c, and the quarter-interpolation pixel 64d are obtained from a sixth interpolation, only 7 to 8 pixels will be obtained effectively.

The 27 or 29 pixels of luminance data thus obtained are divided into write luminance data D11 and write luminance data D12, and written in two different RAM_HSMEs 23, respectively.

(RAM_HSME 23)

The RAM_HSME 23 includes eight RAM_HSMEs 23a to 23h, and stores the partial quarter-pixel luminance data S12 generated by the QPG 12 in units of quarter-pixels so that 4 lines in a vertical direction and 16 pixels in a horizontal direction vary among the RAM_HSMEs 23a to 23h.

FIG. 14 is a schematic diagram of an original pixel area (original image area) 70 stored in the RAM_HSME 23. In the diagram, the n*2 (pixel)×m*4 (line) original pixel area 70 stores a 16 (pixel)×4 (line) extracted rectangular area 47 for calculation (extracted area for luminance data calculation) in an extractable manner. After a horizontal-direction quarter-pixel generation process described later, an 8×4 rectangular area 48 after calculation (reference area after luminance calculation) can be obtained with a quarter-pixel accuracy position from the extracted rectangular area 47 for calculation.

FIGS. 15A to 15D illustrate examples of an obtained rectangular area of luminance data used for motion estimation of quarter-pixel accuracy. An 8×8 rectangular area 71 can be obtained from two rectangular areas 48 after calculation as shown in FIG. 15A, or an 8×16 rectangular area 72 can be obtained from four rectangular areas 48 after calculation as shown in FIG. 15B, or a 16×8 rectangular area 73 can be obtained from four rectangular areas 48 after calculation as shown in FIG. 15C, or a 16×16 rectangular area 74 can be obtained from eight rectangular areas 48 after calculation as shown in FIG. 15D, all with quarter-pixel position accuracy.

The RAM_HSME 23 includes the eight RAM_HSMEs 23a to 23h, and stores the partially quarter-pixel luminance data S12 while satisfying the conditions indicated below. For the purpose of illustration, one of the RAM_HSMEs 23a to 23h will hereafter be indicated as a RAM_HSME 23x.

(1) A storage unit of stored partial quarter-pixel luminance data per address of the RAM_HSME 23x is 16×1. The four kinds of lines (see FIG. 12C) indicated below store the data collectively:

0/4 line: integer pixel (I) and horizontal half-pixel (H)
1/4 line: quarter-pixel (iv) and quarter-pixel (hs)
2/4 line: vertical half-pixel (V) and oblique half-pixel (S)
3/4 line: quarter-pixel (vi) and quarter-pixel (sh)

(2) Writing is performed simultaneously in two or three RAM_HSMEs 23x by two-way or three-way split in units of 27×1 or 29×1 (two RAM_HSMEs 23x can store a maximum of 32×1).

(3) The 16×1 stored partially quarter-pixel luminance data corresponding to pixels adjacent in a horizontal direction are stored to vary among the RAM_HSMEs 23a to 23h.

(4) Four consecutive 16×1 stored partially quarter-pixel luminance data corresponding to pixels adjacent in a vertical direction in units of integers are stored to vary among the RAM_HSMEs 23a to 23h.

(5) Reading is performed after all data of the original pixel area 70 are stored in the RAM$_{HSMEs\ 23}$a to 23h.

(6) Reading is performed simultaneously from the eight RAM_HSMEs 23a to 23h, to obtain a 32×4 read rectangular area in one cycle with quarter-pixel position accuracy.

(7) A 16×4 rectangular area obtained by using the 32×4 read rectangular area is extracted as the extracted rectangular area 47 for calculation in units of quarter-pixels.

(8) The 16×4 extracted rectangular area 47 for calculation is subjected to a horizontal-direction half-interpolation calculation (2 tap filter) which is a prescribed calculation process, to further subject the partial quarter-pixel luminance data S12 to quarter-pixel interpolation in a horizontal direction, thus obtaining an 8×4 rectangular area with quarter-pixel position accuracy in horizontal and vertical directions as the rectangular area 48 after calculation.

FIGS. 16A to 16D illustrate a process of extracting an 8×4 extracted rectangular area. As shown in FIG. 16A, read luminance data D31 to D38 are obtained from the RAM_HSMEs 23a to 23h. Then as shown in FIG. 16B, a 32×4 read rectangular area 58 can be obtained from the read luminance data D31 to D38 to satisfy the above conditions (1), (3) and (4). Then as shown in FIG. 16C, an arbitrary 16×4 rectangular area in the read rectangular area 58 can be extracted as the extracted rectangular area 47 for calculation. Then as shown in FIG. 16D, the 8×4 rectangular area 48 after calculation can be obtained by performing a horizontal-direction 2 tap filter process using the luminance data of the extracted rectangular area 47 for calculation.

Figure 17:
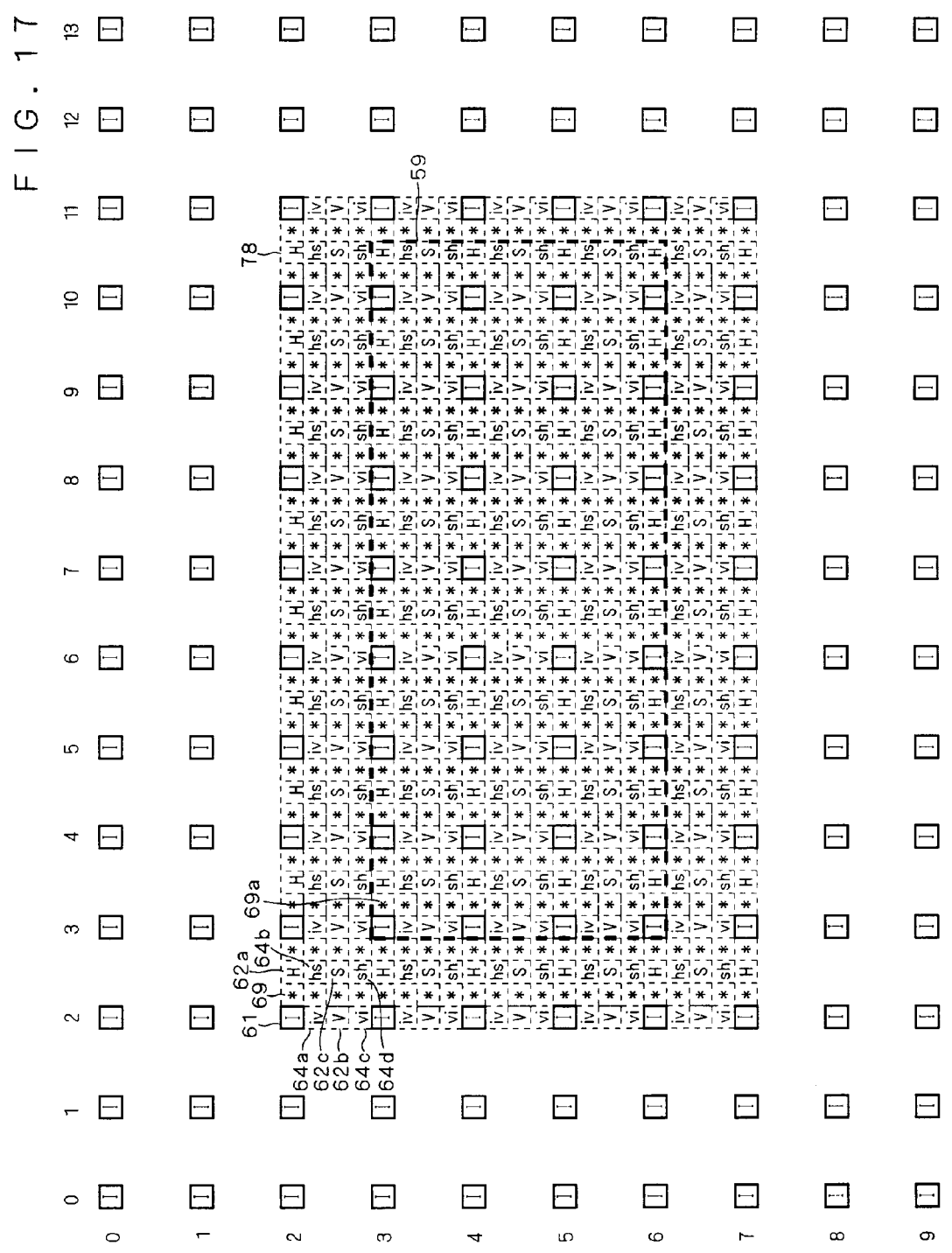

FIG. 17 illustrates a method of calculating the rectangular area 48 after calculation by the SME 13. It is assumed in the diagram that the extracted rectangular area 47 for calculation in the 0/4 line was obtained. The extracted rectangular area 47 for calculation in this case has a 16×4 structure including only the integer pixels 61 (I) and the half-interpolation pixels 62a (H). Namely, 4 lines of the total of 16 pixels including 8 integer pixels 61 and 8 half-interpolation pixels 62a form the extracted rectangular area 47 for calculation.

It is now assumed that the rectangular area 48 after calculation including the quarter-interpolation pixels 69a (see "ih" in FIG. 12C) in the horizontal-direction 1/4 line is obtained from the extracted rectangular area 47 for calculation. In this process, in each of the 4 lines, each of (8) pairs of the integer pixel 61 and the half-interpolation pixel 62a to the right of the integer pixel 61 is subjected to half-interpolation to obtain 8 quarter-interpolation pixels 69a. Ultimately, the rectangular area 48 after calculation including the 8×4 quarter-interpolation pixels 69a can be obtained.

The SME 13 performs motion estimation of quarter-pixel accuracy based on the rectangular area 48 after calculation to output the luminance data S13 that defines the rectangular area 48 after calculation obtained as a final estimation result to the MC 3, and outputs the reference position signal S13p indicative of a reference position of quarter-pixel accuracy of the rectangular area 48 after calculation to the QPG 14.

In the motion estimation system for quarter-pixel luminance with respect to luminance data including the RAM_HMEY 22, the QPG 12, the RAM_HSME 23 and the SME 13, the eight RAM_HSMEs 23a to 23h store the stored quarter-pixel luminance data while satisfying the above conditions (1) to (8).

Accordingly, the extracted rectangular area 47 for calculation capable of calculating the arbitrary rectangular area 48 after calculation in the original pixel area 70 can be extracted by the combination of the eight read luminance data D31 to D38 read from the RAM_HSMEs 23a to 23h by one or reading operation, with improved efficiency in obtaining the rectangular area 48 after calculation.

The improved efficiency in obtaining the rectangular area 48 after calculation allows the SME 13 to perform motion estimation of quarter-pixel accuracy at high speed. Further, the improved efficiency reduces the load of doing calculations by the SME 13, thereby simplifying the circuit structure.

As has been described, the ME 2 includes a motion estimation system for combined luminance. The system includes the motion estimation system having the RAM_HIME 21 and the IME 11, and the motion estimation system for quarter-pixel luminance having the RAM_HMEY 22, the QPG 12, the RAM_HSME 23 and the SME 13.

Thus the SME 13 can perform motion estimation of quarter-pixel accuracy with an integer pixel reference position instructed by the reference position signal S11 as a base point, thereby performing motion estimation based on the luminance data of quarter-pixel accuracy at even higher speed while simplifying the circuit structure.

(Motion Estimation System for Quarter-Pixel Chrominance)

The RAM_HMEC 24 and the QPG 14 form a motion estimation system for quarter-pixel chrominance with respect to chrominance data.

(RAM_HMEC 24, the QPG 14)

FIGS. 18A and 18B are schematic diagrams of an original pixel area (original image area) 38U and an original pixel area (original image area) 38V stored in the RAM_HMEC 24. In FIG. 18A, the n (pixel)×m (line) original pixel area 38U stores a 5 (pixel)×5 (line) rectangular area 39U for calculation (extracted area for chrominance data calculation) in an extractable manner. In FIG. 18B, likewise, the n (pixel)×m (line) original pixel area 38V stores a 5 (pixel)×5 (line) rectangular area 39V for calculation (extracted area for chrominance data calculation) in an extractable manner. FIGS. 18A and 18B are illustrations where n=40 and m=40.

FIGS. 19A to 19D are schematic diagrams of storage areas of the RAM_HMEC 24. As shown, chrominance pixels (U, V) in a horizontal direction are shifted in units of 4 pixels, to store 8 chrominance pixels U and 8 chrominance pixels V at one address.

As shown in FIG. 19A, a storage area (0) stores chrominance pixels (U, V) of 0 to 7 pixels in a horizontal position, with a U pixel and a V pixel being paired, at one address in each of a 0 line to a (m−1) line. As shown in FIG. 19B, a storage area (1) stores chrominance pixels (U, V) of 4 to 11 pixels in a horizontal position, with a U pixel and a V pixel being paired, at one address in each of a 0 line to a (m−1) line. As shown in FIG. 19C, a storage area (2) stores chrominance pixels (U, V) of 8 to 15 pixels in a horizontal position, with a U pixel and a V pixel being paired, at one address in each of a 0 line to a (m−1) line. Subsequently, as shown in FIG. 19D, a storage area (k) similarly stores chrominance pixels (U, V) of (k×4) to {(k×4)+7} pixels in a horizontal position, with a U pixel and a V pixel being paired, at one address in each of a 0 line to a (m−1) line. When the original pixel areas 38U and 38V shown in FIGS. 18A and 18B have a 20×20 structure (n=20, m=20), k is equal to 4 in FIG. 19D.

The RAM_HMEC 24 includes five RAM_HMECs 24a to 24e, and stores the chrominance data D2 so that the chrominance pixels of 5 consecutive lines in a vertical direction in the storage area (i(i=one of 1 to k)) certainly vary among the RAM_HMECs 24a to 24e.

The five RAM_HMECs 24a to 24e store the chrominance data D2 while satisfying the conditions indicated below. For the purpose of illustration, one of the RAM_HMECs 24a to 24e will hereafter be indicated as a RAM_HMEC 24x.

(1) A storage unit per address of the RAM_HMEC 24x is 16×1(2×(8×1)). Eight chrominance pixels U and 8 chrominance pixels V are stored. Namely, a storage unit of stored chrominance data is 8×1 for each of the U and V pixels.

(2) Eight chrominance pixels U and 8 chrominance pixels V are stored at one address while superimposing four pixels of the stored chrominance data in each of the U and V pixels in a horizontal direction.

(3) Five consecutive 16×1(2×(8×1)) chrominance data corresponding to pixels adjacent in a vertical direction (8×1 stored chrominance data in each of the U and V pixels) are stored to vary among the RAM_HMECs 24a to 24e.

(4) Reading is performed after all data of the original pixel areas 38U and 38V are stored in the RAM_HMECs 24a to 24e from the SDRAM 1.

(5) Reading is performed simultaneously from the five RAM_HMECs 24a to 24e, to obtain a 16(8+8)×5 read rectangular area in one cycle.

(6) The (5+5)×5 rectangular area 39U for calculation and rectangular area 39V for calculation are obtained from the (8+8)×5 read rectangular area.

(7) The (5+5)×5 rectangular area 39U for calculation and rectangular area 39V for calculation are subjected to a two-dimensional linear interpolation process (bi-linear filter), to extract (4+4)×4 rectangular area 40U after calculation and rectangular area 40V after calculation (reference areas after chrominance calculation) of quarter-pixel accuracy.

A chrominance pixel stores a half amount of information compared with a luminance pixel. Thus, with sufficient processing time, the RAM_HMECs 24a to 24e may be replaced by one RAM_HMEC 24t. This reduces the number of SRAMs of the RAM_HMEC 24.

When the RAM_HMEC 24 consists of the one RAM_HMEC 24t, the "RAM_HMEC 24x" mentioned in the above condition (1) for the RAM_HMECs 24a to 24e is replaced by "one RAM_HMEC 24t", the condition (3) becomes unnecessary, and the "RAM_HMECs 24a to 24e" mentioned in the condition (4) are replaced by "one RAM_HMEC 24t".

Also, the condition (5) is changed to read "Reading is performed from the one RAM_HMEC 24t, to obtain a 16 (8+8)×5 read rectangular area in five cycles". The other conditions are identical to those mentioned above.

FIGS. 20A to 20C illustrate a process of extracting a 5×5 extracted rectangular area. As shown in FIG. 20A, read chrominance data D27 is obtained from the RAM_HMEC 24x. Then as shown in FIG. 20B, an arbitrary (8+8)×5 read rectangular area (in only one line is shown) can be obtained from the read chrominance data D27 of each of the RAM_HMECs 24a to 24e to satisfy the above conditions (2) and (3). When reading is performed from the one RAM_HMEC 24t, an arbitrary (8+8)×5 read rectangular area can be obtained by reading the read chrominance data D27 in five cycles.

Then as shown in FIG. 20C, an extracted rectangular area 49 (in only one line is shown) can be extracted which will become the arbitrary (5+5)×5 rectangular area 39U for calculation and rectangular area 39V for calculation in the read rectangular area shown in FIG. 20B. The extracted rectangular area 49 includes an extracted rectangular area 49u and an extracted rectangular area 49v. Five lines of the extracted rectangular area 49u form the rectangular area 39U for calculation, and five lines of the extracted rectangular area 49v form the rectangular area 39V for calculation.

FIGS. 21A and 21B are schematic diagrams of a two-dimensional linear interpolation process (bi-linear filter), a calculation process by the QPG 14. The QPG 14 receives the reference position signal S13p of quarter-pixel accuracy from the SME 13, and extracts the rectangular areas 39U and 39V for calculation capable of calculating the 4×4 rectangular areas 40U and 40V after calculation.

As shown in FIG. 21A, in 5×5 U integer pixels 65 in the rectangular area 39U for calculation, one U interpolation pixel 67 is calculated by interpolation with four U integer pixels 65, thereby obtaining the rectangular area 40U after calculation that includes 4×4 U interpolation pixels 67.

Weights assigned to the interpolation calculation of the four U integer pixels 65 are changed depending on the reference position signal S13p.

As shown in FIG. 21B, in 5×5 V integer pixels 66 in the rectangular area 39V for calculation, one V interpolation pixel 68 is calculated by interpolation with four V integer pixels 66, thereby obtaining the rectangular area 40V after calculation that includes 4×4 V interpolation pixels 68. Weights assigned to the interpolation calculation of the four V integer pixels 66 are changed depending on the reference position signal S13p.

The U interpolation pixels 67 and V interpolation pixels 68 of the rectangular area 40U after calculation and rectangular area 40V after calculation thus obtained are defined, to be output as the chrominance data S14.

As described above, in the motion estimation system for quarter-pixel chrominance with respect to chrominance data including the RAM_HMEC 24 and the QPG 14, the five RAM_HMECs 24a to 24e store the stored chrominance data while satisfying the above conditions (1) to (7).

Accordingly, the arbitrary rectangular areas 40U and 40V after calculation in the original pixel areas 38U and 38V can be obtained by the combination of the five read chrominance data D27 read from the RAM_HMECs 24a to 24e by one reading operation, with improved efficiency in obtaining the rectangular areas 40U and 40V after calculation.

The improved efficiency in obtaining the rectangular areas 40U and 40V after calculation allows the QPG 14 to perform motion estimation of quarter-pixel accuracy at high speed. Further, the improved efficiency reduces the load of doing calculations by the QPG 14, thereby simplifying the circuit structure.

Moreover, when the RAM_HMEC 24 consists of the one RAM_HMEC 24t in an environment with sufficient processing time for chrominance pixels, the number of RAMs can be reduced and efficient motion estimation of quarter-pixel accuracy can be performed.

As has been described, the ME 2 according to the first preferred embodiment includes the motion estimation system having the RAM_HIME 21 and the IME 11, the motion estimation system for quarter-pixel luminance having the RAM_HMEY 22, the QPG 12, the RAM_HSME 23 and the SME 13, and the motion estimation system for quarter-pixel chrominance having the RAM_HMEC 24 and the QPG 14. Thus the ME 2 can perform motion estimation based on the luminance data and chrominance data of quarter-pixel accuracy at even higher speed, and output the luminance and chrominance data D3 which is the estimation result including the luminance data S13 and the chrominance data S14 with quarter-pixel position accuracy at high speed, while simplifying the circuit structure.

A minimum number of SRAMs is required by storing the luminance data D1 or the chrominance data D2 in the RAM_HIME 21, the RAM_HMEY 22, the RAM_HSME 23 and the RAM_HMEC 24 serving as storage sections, respectively, while satisfying the storage conditions mentioned above. Further, a calculation section requires a simplest circuit structure by dispersing the calculation functions of the IME 11, the QPG 12, the SME 13 and the QPG 14 serving as the calculation sections in accordance with purposes (a luminance data search (integer-pixel accuracy, quarter-pixel accuracy), a chrominance data search). Therefore, the ME 2 can be attained with a relatively inexpensive structure.

(Others)

In the first preferred embodiment, the ME 2 serving as a motion estimation system for combined luminance and chrominance includes the motion estimation system for integer pixel luminance having the RAM_HIME 21 and the IME 11, the motion estimation system for quarter-pixel luminance having the RAM_HMEY 22, the QPG 12, the RAM_HSME 23 and the SME 13, and the motion estimation system for quarter-pixel chrominance having the RAM_HMEC 24 and the QPG 14. Alternatively, the ME 2 may employ motion estimation systems indicated below:

While the QPG 14 uses the reference position signal S13p as reference position information for determining the chrominance data S14 in the first preferred embodiment, the QPG 14 may obtain estimation result chrominance data of integer-pixel accuracy by capturing information instructing the reference position of the luminance data of integer-pixel accuracy which is the estimation result from the IME 11. Namely, the above motion estimation system for integer pixel luminance and the above motion estimation system for quarter-pixel chrominance may form a motion estimation system for combined luminance and chrominance of integer-pixel accuracy.

While the SME 13 performs motion estimation of quarter-pixel accuracy based on the reference position signal S11 from the IME 11, the SME 13 may perform motion estimation of quarter-pixel accuracy in a searchable entire image area without having to use the reference position signal S1. Namely, the above motion estimation system for quarter-pixel luminance and the above motion estimation system for quarter-pixel chrominance may form a motion estimation system for combined luminance and chrominance of quarter-pixel accuracy while omitting the above motion estimation system for integer pixel luminance.

While the QPG 12 obtains the partial quarter-pixel luminance data S12 including luminance data of quarter-pixel accuracy only in a vertical direction and the SME 13 obtains luminance data of quarter-pixel accuracy in a horizontal direction by a prescribed calculation process, the horizontal and vertical directions can be reversed. Namely, the QPG 12 may obtain partial quarter-pixel luminance data including luminance data of quarter-pixel accuracy only in a horizontal direction and the SME 13 may obtain luminance data of quarter-pixel accuracy in a vertical direction by a prescribed calculation process.

Moreover, the number of RAMs can be reduced by sharing RAMs between the RAM_HMEY 22 and the RAM_HMEC 24.

<Second Preferred Embodiment>

(Overall Structure)

Figure 22:
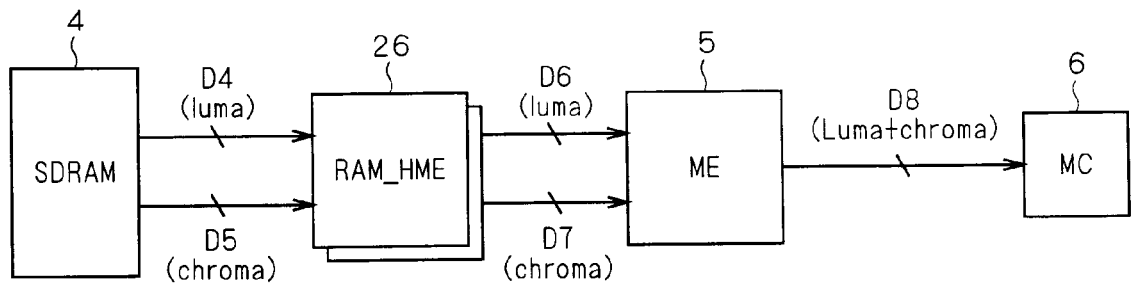
FIG. 22 is a block diagram of a motion estimation system and its peripheral structure according to a second preferred embodiment of the present invention.

FIG. 22 is a block diagram of a motion estimation system and its peripheral structure according to a second preferred embodiment of the present invention. As shown, a RAM_HME (H.264 motion estimation) 26, a storage section for a quarter-pixel search, receives luminance data D4 and chrominance data D5 from a SDRAM 4, and stores the data while satisfying the conditions described later.

A ME 5, a quarter-pixel motion estimation section capable of performing motion estimation with quarter-pixel accuracy that includes integer-pixel accuracy, performs a comprehensive search process described later by using luminance data D6 and chrominance data D7 provided from the RAM_HME 26, to output luminance and chrominance data D8 (estimation result luminance data and estimation result chrominance data) as an estimation result of quarter-pixel accuracy to a MC 6, a motion compensation system. The RAM_HME 26 and the ME 5 form a quarter-pixel motion estimation system.

(Luminance Data Process)

Figure 23:
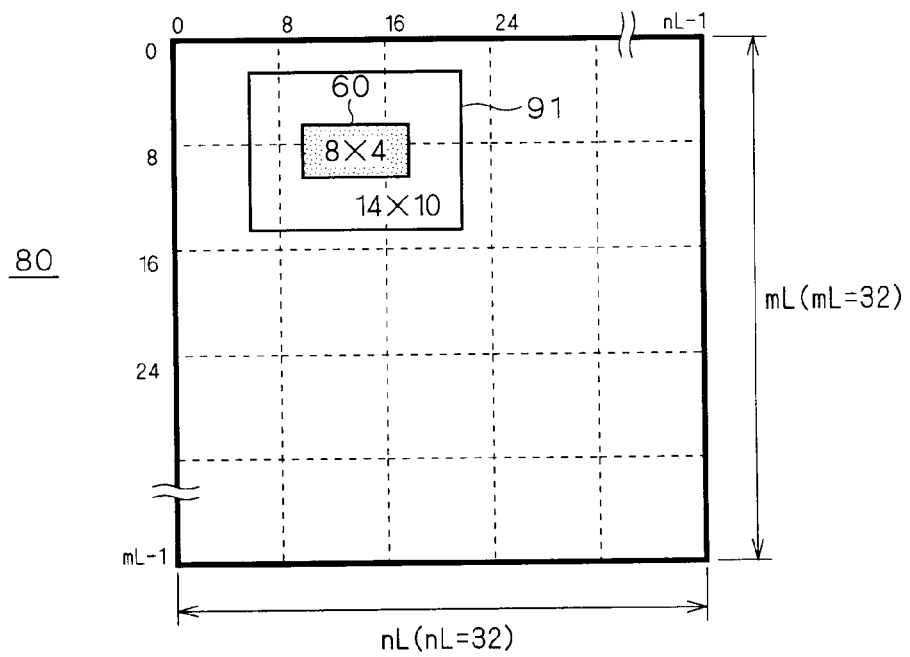
FIG. 23 is a schematic diagram of an original pixel area stored in a RAM_HME shown in FIG. 22.

FIG. 23 is a schematic diagram of an original pixel area 80 stored in the RAM_HME 26. In the diagram, the nL (pixel)× mL (line) original pixel area 80 stores a 14 (pixel)×10 (line)

read rectangular area 91 in an extractable manner. After vertical-direction and horizontal-direction quarter-pixel generation processes described later, an 8×4 rectangular area 60 after calculation (reference area after luminance calculation) is obtained with a quarter-pixel accuracy position from the read rectangular area 91. FIG. 23 is an illustration where nL=32 and mL=40.

Figure 24A:
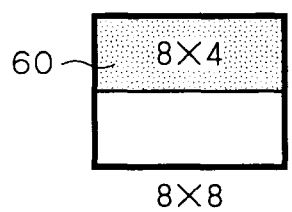
FIGS. 24A to 24D illustrate examples of an obtained rectangular area of luminance data used for motion estimation.
Figure 24B:
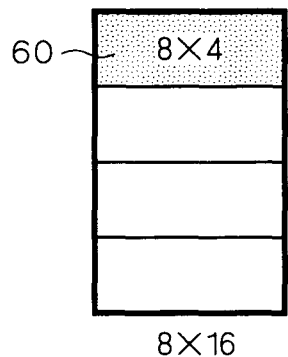
Figure 24C:
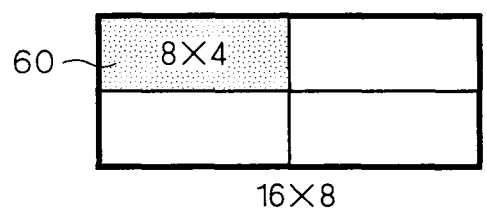
Figure 24D:
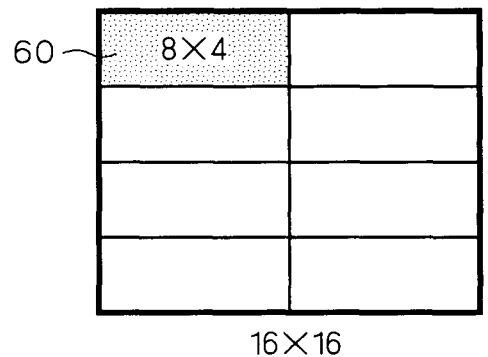

FIGS. 24A to 24D illustrate examples of an obtained rectangular area of luminance data used for motion estimation. An 8×8 rectangular area 81 can be obtained from two rectangular areas 60 after calculation as shown in FIG. 24A, or an 8×16 rectangular area 82 can be obtained from four rectangular areas 60 after calculation as shown in FIG. 24B, or a 16×8 rectangular area 83 can be obtained from four rectangular areas 60 after calculation as shown in FIG. 24C, or a 16×16 rectangular area 84 can be obtained from eight rectangular areas 60 after calculation as shown in FIG. 24D.

FIGS. 25A to 25D are schematic diagrams of luminance data storage areas of the RAM_HME 26. As shown, luminance pixels in a horizontal direction are shifted in units of 4 pixels, to store 16 pixels at one address.

As shown in FIG. 25A, a storage area L (0) stores luminance pixels of 0 to 15 pixels in a horizontal position at one address in each of a 0 line to a (mL−1) line. As shown in FIG. 25B, a storage area L (1) stores luminance pixels of 4 to 19 pixels in a horizontal position at one address in each of a 0 line to a (mL−1) line. As shown in FIG. 25C, a storage area L (2) stores luminance pixels of 8 to 23 pixels in a horizontal position at one address in each of a 0 line to a (mL−1) line. Subsequently, as shown in FIG. 25D, a storage area L (k) similarly stores luminance pixels of (k×4) to {(k×4)+15} pixels in a horizontal position at one address in each of a 0 line to a (mL−1) line. When the original pixel area 80 shown in FIG. 23 has a 32×32 structure (nL=32, mL=32), k is equal to 4 in FIG. 25D.

The RAM_HME 26 includes ten RAM_HMEs 26a to 26j, and stores the luminance data D4 and the chrominance data D5 so that the luminance pixels of 10 (at least 9) consecutive lines in a vertical direction in the storage area L (i (i=one of 1 to k)) certainly vary among the RAM_HMEs 26a to 26j.

The RAM_HME 26 includes the ten RAM_HMEs 26a to 26j as mentioned above, and stores the luminance data D4 and the chrominance data D5 while satisfying the conditions indicated below. For the purpose of illustration, one of the RAM_HMEs 26a to 26j will hereafter be indicated as a RAM_HME 26x.

(1) A storage unit of stored luminance data per address of the RAM_HME 26x is 16×1. Sixteen luminance pixels are stored.

(2) Sixteen pixels of stored luminance data are stored at one address while being superimposed in units of four pixels in a horizontal direction.

(3) Ten (at least nine) consecutive 16×1 stored luminance data corresponding to pixels adjacent in a vertical direction are stored to vary among the RAM_HMEs 26a to 26j.

(4) Reading is performed after all data of the original pixel area 80 are stored in the RAM_HMEs 26a to 26j from the SDRAM 4.

(5) Reading is performed simultaneously from the ten RAM_HMEs 26a to 26j, to obtain a 16×10 read rectangular area in one cycle.

(6) A 13×9 rectangular area 59 for calculation is obtained from the 16×10 read rectangular area.

(7) The 13×9 rectangular area 59 for calculation is subjected to parallel calculations by a 2 tap filter and a 6 tap filter, to extract the 8×4 rectangular area 60 after calculation of quarter-pixel accuracy in both horizontal and vertical directions.

FIGS. 26A to 26D illustrate a process of extracting the 8×4 rectangular area 60 after calculation. As shown in FIG. 26A, read luminance data D41 to D50 are obtained from the RAM_HMEs 26a to 26j. Then as shown in FIG. 26B, an arbitrary 16×10 read rectangular area 57 can be obtained from the read luminance data D41 to D50 of each of the RAM_HMEs 26a to 26j to satisfy the above conditions (2) and (3).

Then as shown in FIG. 26C, the arbitrary 13×9 rectangular area 59 for calculation (extracted area for luminance data calculation) in the read rectangular area 68 shown in FIG. 26B can be extracted. A quarter-pixel parallel calculation process (prescribed calculation process) is performed based on integer pixel data in the rectangular area 59 for calculation, thereby obtaining the rectangular area 60 after calculation of quarter-pixel accuracy as shown in FIG. 26D.

Figure 27:
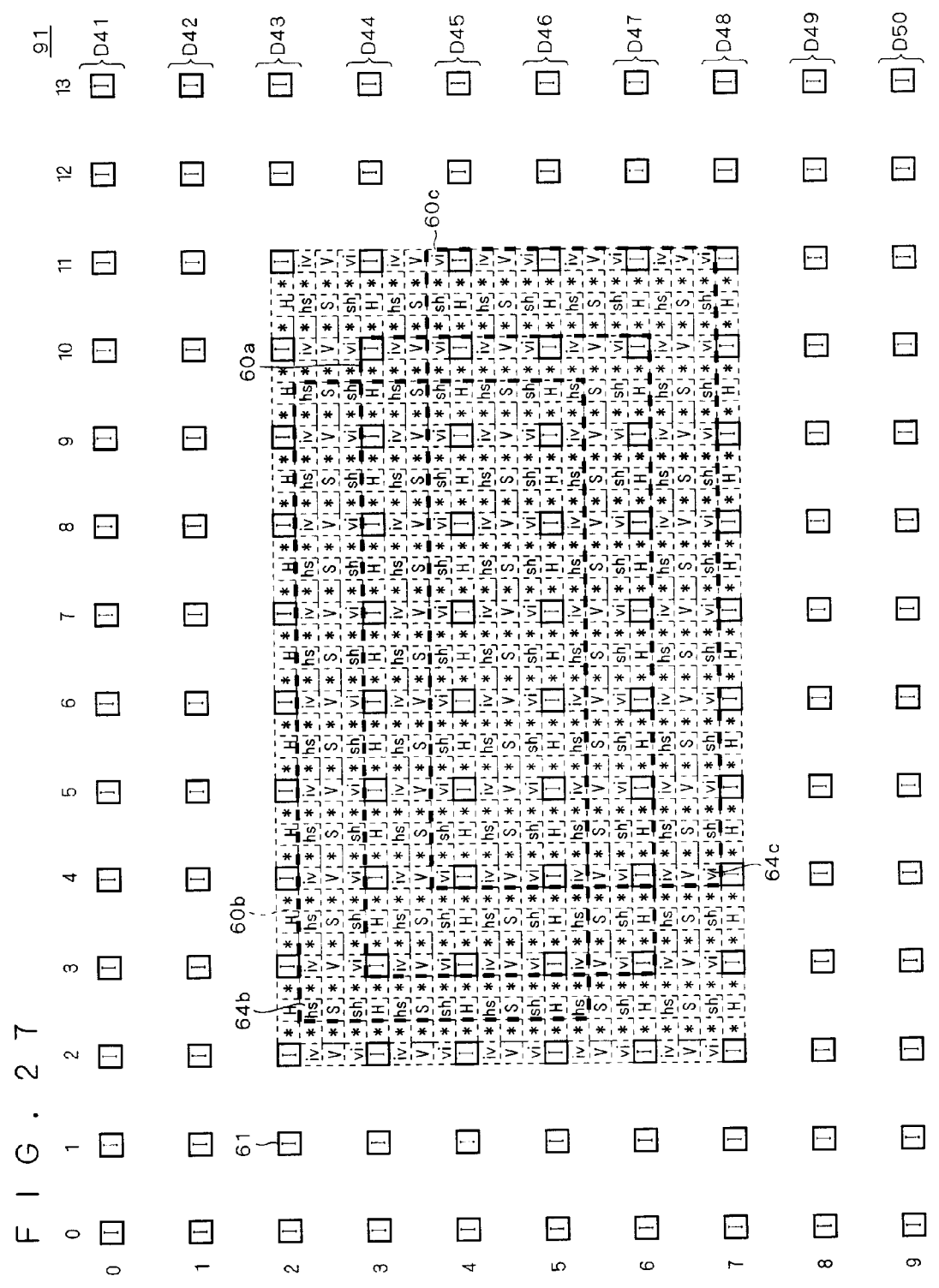

FIG. 27 illustrates the calculation process for obtaining the 8×4 rectangular area 60 after calculation of quarter-pixel accuracy. As shown, 14 pixels of data of each of the read luminance data D41 to D50 form the 14×10 read rectangular area 91 made of integer pixels 61. To obtain the 8×4 rectangular area 60 after calculation, the 13×9 rectangular area 59 for calculation made of integer pixels 61 is sufficient enough. Yet for the purpose of illustration, the read rectangular area 91 will be used as an example.

The arbitrary 8×4 rectangular area 60 after calculation of quarter-pixel accuracy can be obtained from the read rectangular area 91. Namely, the following interpolation processes (quarter-pixel parallel calculation process) are executable:

(1) A 6 tap filter process is performed with six integer pixels 61 adjacent in a horizontal direction, to sequentially obtain (horizontal direction) half-interpolation pixels 62a (H) (6 tap filter).

(2) A 6 tap filter process is performed with six integer pixels 61 adjacent in a vertical direction, to sequentially obtain (vertical direction) half-interpolation pixels 62b (V) (6 tap filter).

(3) A 6 tap filter process is performed with six half-interpolation pixels 62a adjacent in a vertical direction, to obtain an oblique half-interpolation pixel 62c (S) (6 tap filter).

(4) A 2 tap filter process is performed with the integer pixels 61 and the half-interpolation pixels 62b adjacent in a vertical direction, to obtain (vertical direction) quarter-interpolation pixels 64a (iv) and 64c (vi).

(5) A 2 tap filter process is performed with the half-interpolation pixels 62a and 62c adjacent in a vertical direction, to obtain (vertical direction) quarter-interpolation pixels 64b (hs) and 64d (sh).

(6) A 2 tap filter process is performed with the integer pixels 61 and the half-interpolation pixels 62a adjacent in a horizontal direction, to obtain (horizontal direction) quarter-interpolation pixels 69a (ih) and 69b (hi) (see FIGS. 12C for "ih" and "hi").

(7) A 2 tap filter process is performed with the quarter-interpolation pixels 64a and 64b adjacent in a horizontal direction, to obtain (horizontal direction) quarter-interpolation pixels 69c (vh) and 69d (hv) (see FIGS. 12C for "vh" and "hv").

(8) A 2 tap filter process is performed with the half-interpolation pixels 62b and 62c adjacent in a horizontal direction, to obtain (horizontal direction) quarter-interpolation pixels 69e (vs) and 69f (sv) (see FIGS. 12C for "vs" and "sv").

(9) A 2 tap filter process is performed by the quarter-interpolation pixels 64c and 64d adjacent in a horizontal direction, to obtain (horizontal direction) quarter-interpolation pixels 69g (vh') and 69h (hv') (see FIGS. 12C for "vh" and "hv").

The quarter-pixel parallel calculation process including the above processes (1) to (9) can be performed upon obtainment of the base data for each of the processes (1) to (9). Thus quite a large amount of processes can be performed in parallel (for example, the processes (1) and (2) can be performed in parallel). This allows the rectangular area 60 after calculation to be obtained faster compared with the first preferred embodiment.

To obtain an 8×4 rectangular area 60a after calculation made of the integer pixels 61 (I), for example, the existence of the integer pixels 61 in the rectangular area 60a after calculation is sufficient enough. The rectangular area 60a after calculation can therefore be extracted from the read rectangular area 91 without having to performing the processes (1) to (9).

Also, an 8×4 rectangular area 60b after calculation made of the quarter-interpolation pixels 64b (hs) can be obtained by performing the processes (1), (3) and (5). Likewise, an 8×4 rectangular area 60c after calculation made of the quarter-interpolation pixels 64c (vi) can be obtained by performing the processes (2) and (4).

In this manner, the ME 5 obtains the rectangular area 60 after calculation of quarter-pixel accuracy that includes integer-pixel accuracy at high speed based on the luminance data D6 of integer-pixel accuracy stored in the RAM_HME 26 to perform motion estimation with integer-pixel accuracy or quarter-pixel accuracy, thereby obtaining the estimation result luminance data of integer-pixel accuracy or quarter-pixel accuracy.

Thus the ME 5 can obtain the estimation result luminance data of quarter-pixel accuracy forming the luminance and chrominance data D8 faster than when the ME 2 obtains the luminance data S13 after performing motion estimation with integer-pixel accuracy to detect a reference position of the estimation result luminance data of integer-pixel accuracy, and then performing motion estimation with quarter-pixel accuracy in a range of $\{-0.75 \sim +0.75\}$ from the reference position in the first preferred embodiment.

The ME 5 is capable of performing motion estimation of quarter-pixel accuracy directly based on the luminance data D6 made of integer pixels. Therefore, estimation result luminance data of quarter-pixel accuracy can be obtained at the beginning of estimation by performing motion estimation of quarter-pixel accuracy without performing motion estimation of integer-pixel accuracy.

As described above, in the ME 5 according to the second preferred embodiment, the ten RAM_HMEs 26a to 26j store the stored luminance data while satisfying the above conditions (1) to (9).

Accordingly, the arbitrary rectangular area 60 after calculation in the original pixel area 80 can be obtained by the combination of the read luminance data D41 to D50 read from the RAM_HMEs 26a to 26j by one reading operation, with improved efficiency in obtaining the rectangular area 60 after calculation.

The improved efficiency in obtaining the rectangular area 60 after calculation allows the ME 5 to perform motion estimation of quarter-pixel accuracy at high speed. Further, the improved reading efficiency reduces the load of doing calculations by the ME 5, thereby simplifying the circuit structure.

(Chrominance Data Process)

FIGS. 28A and 28B are schematic diagrams of an original pixel area 85 for U pixels and an original pixel area 86 for V pixels stored in the RAM_HME 26. In the diagrams, the nC (pixel)×mC (line) original pixel areas 85 and 86 store a 5 (pixel)×5 (line) rectangular area 87 for U calculation and a 5 (pixel)×5 (line) rectangular area 88 for V calculation (extracted areas for chrominance data calculation) in an extractable manner, respectively. A rectangular area 89 after U calculation and a rectangular area 90 after V calculation (reference areas after chrominance data calculation) corresponding to the 8×4 rectangular area 60 after calculation based on the estimation result luminance data mentioned above are obtained from the rectangular area 87 for U calculation and the rectangular area 88 for V calculation, respectively.

FIGS. 29A and 29B are schematic diagrams of chrominance data storage areas of the RAM_HME 26. As shown, chrominance pixels (U, V) in a horizontal direction are shifted in units of 16 pixels without being superimposed, to store 8 chrominance pixels U and 8 chrominance pixels V at one address. An area C (0) to an area C (k) are set in FIGS. 29A and 29B in a corresponding manner to the area L (0) to the area L (k) shown in FIGS. 25A to 25D, so the amount of storage per address of the area C (i) is apparently 32 pixels. However, 8 U pixels and 8 V pixels are actually stored at one address. For example, at the address 0 of the area C (0), the RAM_HME 26a stores high-order 8 U pixels and high-order 8 V pixels (8 to 15) of the line 0, and the RAM_HME 26b stores low-order 8 U and V pixels (0 to 7) of the line 0.

As shown in FIG. 29A, the storage area C (0) stores chrominance pixels (U, V) of 0 to 15 pixels in a horizontal position, with a U pixel and a V pixel being paired, at one address in each of a 0 line to a (m−1) line by allocating high-order 8 pixels and low-order 8 pixels between the two RAM_HMEs 26 as described above. Subsequently, as shown in FIG. 29B, a storage area C (k) similarly stores chrominance pixels (U, V) of (k×16) to {(k×16)+15} pixels in a horizontal position, with a U pixel and a V pixel being paired, at one address in each of a 0 line to a (m−1) line by allocating high-order 8 pixels and low-order 8 pixels between the two RAM_HMEs 26. When the original pixel areas 85 and 86 shown in FIGS. 28A and 28B have a 16×16 structure (nC=16, mC=16), k is equal to 0 in FIG. 29B.

The RAM_HME 26x stores the chrominance data while satisfying the conditions indicated below:

(1) A storage unit per address of the RAM_HME 26x is 16×1(2×(8×1)). Eight chrominance pixels U and 8 chrominance pixels V are stored. Namely, a storage unit of stored chrominance data is 8×1 for each of the U and V pixels.

(2) Eight chrominance pixels U and 8 chrominance pixels V are stored at one address without being superimposed in a horizontal direction.

(3) 16×1(2×(8×1)) chrominance data corresponding to pixels adjacent in a horizontal direction (8×1 stored chrominance data for each of the U and V pixels) are stored to vary among the RAM_HMEs 26a to 26j.

(4) Five consecutive 16×1(2×(8×1)) chrominance data corresponding to pixels adjacent in a vertical direction (8×1 stored chrominance data for each of the U and V pixels) are stored to vary among the RAM_HMEs 26a to 26j.

(5) Reading is performed after all data of the original pixel areas 85 and 86 are stored in the RAM_HMEs 26a to 26j from the SDRAM 4.

(6) Reading is performed simultaneously from the ten RAM_HMEs 26a to 26j, to obtain a 16 (8+8)×5 read rectangular area in one cycle.

(7) The (5+5)×5 rectangular area 87 for U calculation and rectangular area 88 for V calculation are obtained from the (8+8)×5 read rectangular area.

(8) The (5+5)×5 rectangular area 87 for U calculation and rectangular area 88 for V calculation are subjected to a bi-linear filter, to extract the (4+4)×4 rectangular area 89 after U calculation and rectangular area 90 after V calculation of quarter-pixel accuracy.

FIGS. 30A to 30C illustrate a process of extracting 5×5 extracted rectangular areas. As shown in FIG. 30A, read chrominance data D51 to D55 are obtained from the RAM_HMEs 26a to 26j. Then as shown in FIG. 30B, an arbitrary (16+16)×5 read rectangular area can be obtained from the read chrominance data D51 to D55 from the RAM_HMEs 26a to 26j to satisfy the above conditions (3) and (4). Namely, a 16×5 read rectangular area for U pixels is obtained from read chrominance data D51u to D55u for U pixels in the read chrominance data D51 to D55, and a 16×5 read rectangular area for V pixels is obtained from read chrominance data D51v to D55v for V pixels in the read chrominance data D51 to D55.

Then as shown in FIG. 30C, the arbitrary 5×5 rectangular area 87 for U calculation and 5×5 rectangular area 88 for V calculation in the read rectangular area shown in FIG. 30B can be extracted.

FIGS. 31A and 31B are schematic diagrams of a two-dimensional linear interpolation process (bi-linear filter) by the ME 5. As shown in FIG. 31A, in 5×5 U integer pixels 65 in the rectangular area 87 for U calculation, one U interpolation pixel 67 is calculated by interpolation with four U integer pixels 65, thereby obtaining the rectangular area 89 after U calculation that includes 4×4 U interpolation pixels 67. Weights assigned to the interpolation calculation of the four U integer pixels 65 are changed depending on the reference position of the rectangular area 60 after calculation in the estimation result luminance data of quarter-pixel accuracy.

As shown in FIG. 31B, in 5×5 V integer pixels 66 in the rectangular area 88 for V calculation, one V interpolation pixel 68 is calculated by interpolation with four V integer pixels 66, thereby obtaining the rectangular area 90 after V calculation that includes 4×4 V interpolation pixels 68. Weights assigned to the interpolation calculation of the four V integer pixels 66 are changed depending on the reference position of the rectangular area 60 after calculation in the luminance data.

The U interpolation pixels 67 and V interpolation pixels 68 of the rectangular area 89 after U calculation and rectangular area 90 after V calculation are defined as estimation result chrominance data. The estimation result luminance data mentioned above and this estimation result chrominance data are output to the MC 6 as the luminance and chrominance data D8.

In this manner, the rectangular area 87 for U calculation and the rectangular area 88 for V calculation which are necessary for calculating the rectangular area 89 after U calculation and the rectangular area 90 after V calculation can be obtained from the RAM_HME 26 in one cycle. The ME 5 can therefore calculate chrominance data of the rectangular area 89 after U calculation and the rectangular area 90 after V calculation at high speed based on the chrominance data D7 stored in the RAM_HME 26.

As described above, in the ME 5 according to the second preferred embodiment, the ten RAM_HMEs 26a to 26j store the stored chrominance data while satisfying the above conditions (1) to (8).

Accordingly, the arbitrary rectangular area 89 after U calculation and rectangular area 90 after V calculation in the original pixel areas 85 and 86 can be obtained by the combination of the read chrominance data D51 to D55 read from the RAM_HMEs 26a to 26j by one reading operation, with improved efficiency in obtaining the areas 89 and 90.

The improved efficiency in obtaining the rectangular area 89 after U calculation and the rectangular area 90 after V calculation allows the ME 5 to perform motion estimation of quarter-pixel accuracy with respect to chrominance data. Further, the improved efficiency reduces the load of doing calculations by the ME 5, thereby simplifying the circuit structure.

As described above, the ME 5 according to the second preferred embodiment can obtain the luminance and chrominance data D8 faster than when the ME 2 according to the first preferred embodiment obtains the luminance and chrominance data D3. Further, the first preferred embodiment needs four RAM_HIMEs 21, two RAM_HMEYs 22, eight RAM_HSMEs 23 and five (one) RAM_HMECs 24, totaling nineteen (fifteen) (S)RAMs, while the second preferred embodiment only requires ten RAM_HMEs 26. This reduces the number of (S)RAMs compared with the first preferred embodiment.

Moreover, the RAM_HME 26 according to the second preferred embodiment is only required to store integer pixels and does not need to store quarter-pixels like the RAM_H-SME 23 according to the first preferred embodiment. This reduces (S)RAM capacitance. Note however that the ME 5, which needs to perform quite a large amount of parallel calculation processes in order to obtain luminance data of quarter-pixel accuracy based on the luminance data D6 of integer-pixel accuracy, has a more complicated circuit structure than the IME 11, the QPG 12, the SME 13 and the QPG 14 forming the ME 2.

While the invention has been shown and described in detail, the foregoing description is in all aspects illustrative and not restrictive. It is therefore understood that numerous modifications and variations can be devised without departing from the scope of the invention.

What is claimed is:

1. A motion estimation system, comprising:
a predetermined number of separate storage units for an integer pixel search that receive luminance data of integer-pixel of integer-pixel accuracy in a prescribed image area, divide the luminance data of integer-pixel accuracy in the prescribed image area, and store said luminance data by a prescribed unit as stored luminance data; and
an integer pixel motion estimation section that extracts a prescribed reference extracted area based on a combination of said stored luminance data read from said predetermined number of separate storage units for the integer pixel search and performs motion estimation with integer-pixel accuracy,
wherein in said predetermined number of separate storage units for the integer pixel search, said stored luminance data corresponding to pixels adjacent in a horizontal direction and a vertical direction and four consecutive said stored luminance data corresponding to pixels adjacent in said horizontal direction are distributed among said predetermined number of separate storage units for the integer pixel search to be able to be simultaneously extracted from said predetermined number of separate storage units for the integer pixel search by one reading operation.

2. A motion estimation system for quarter-pixel luminance, comprising:
a temporary storage unit for luminance that stores luminance data of integer-pixel accuracy in a prescribed image area;

a quarter-pixel generation section for luminance that performs a horizontal-direction interpolation process and a vertical-direction interpolation process based on said luminance data read from said temporary storage unit for luminance to generate partial quarter-pixel luminance data, said partially quarter-pixel luminance data being luminance data of quarter-pixel accuracy only in one direction of said horizontal direction and vertical direction;

a predetermined number of separate storage units for a quarter-pixel search that divide said partial quarter-pixel luminance data and store said partial quarter pixel luminance data by a prescribed unit as stored quarter-pixel luminance data; and a quarter-pixel motion estimation section that performs a prescribed calculation process based on a combination of said stored quarter-pixel luminance data read from said predetermined number of separate storage units for the quarter-pixel search, to obtain a prescribed reference area after luminance calculation with quarter-pixel accuracy in both of said horizontal direction and vertical direction and perform motion estimation with quarter-pixel accuracy, said prescribed calculation process including an interpolation process in the other direction than said one direction to calculate luminance data of quarter-pixel accuracy in said other direction, wherein in said predetermined number of separate storage units for the quarter-pixel search, said stored quarter-pixel luminance data corresponding to pixels adjacent in said other direction and four consecutive said stored quarter-pixel luminance data corresponding to pixels adjacent in units of integer pixels in said one direction are distributed among said predetermined number of separate storage units for the quarter-pixel search to be able to be simultaneously extracted from said predetermined number of separate storage units for the quarter-pixel search by one reading operation.

3. A motion estimation system for quarter-pixel chrominance, comprising:

a predetermined number of separate storage units for a chrominance that receive chrominance data of integer-pixel accuracy in a prescribed image area, divide the chrominance data of integer-pixel accuracy in the prescribed image area, and store said data in units of stored chrominance data; and a quarter-pixel generation section for chrominance that performs a calculation process based on reference position information of quarter-pixel accuracy in accordance with a combination of said stored chrominance data read from said predetermined number of separate storage units for the chrominance, to generate a prescribed reference area after chrominance calculation of quarter-pixel accuracy as estimation result chrominance data, wherein in said predetermined number of separate storage units for the chrominance, said stored chrominance data corresponding to pixels adjacent in a horizontal direction are stored by being superimposed in units of a first number of pixels, and a second number of consecutive said stored chrominance data corresponding to pixels adjacent in a vertical direction are distributed among said predetermined number of separate storage units for the chrominance to be able to be simultaneously extracted from said predetermined number of separate storage units for the chrominance by one reading operation.

4. A motion estimation system for combined luminance, comprising:

a motion estimation system; and a motion estimation system for quarter-pixel luminance, said motion estimation system including:

a first predetermined number of separate storage units for an integer pixel search that receive luminance data of integer-pixel accuracy in a prescribed image area, divide the luminance data of integer-pixel accuracy in the prescribed image area, and store said luminance data by a prescribed unit as stored luminance data; and an integer pixel motion estimation section that extracts a prescribed reference extracted area based on a combination of said stored luminance data read from said first predetermined number of separate storage units for the integer pixel search, to perform motion estimation with integer-pixel accuracy, wherein in said first predetermined number of separate storage units for the integer pixel search, said stored luminance data corresponding to pixels adjacent in a horizontal direction and a vertical direction and four consecutive said stored luminance data corresponding to pixels adjacent in said horizontal direction are distributed among said first predetermined number of separate storage units for the integer pixel search to be able to be simultaneously extracted from said first predetermined number of separate storage units for the integer pixel search by one reading operation, said motion estimation system for quarter-pixel luminance including:

a temporary storage unit for luminance that stores the luminance data of integer-pixel accuracy in the prescribed image area;

a quarter-pixel generation section for luminance that performs a horizontal-direction interpolation process and a vertical-direction interpolation process based on said luminance data read from said temporary storage unit for luminance to generate partial quarter-pixel luminance data, said partially quarter-pixel luminance data being luminance data of quarter-pixel accuracy only in one direction of said horizontal direction and vertical direction;

a second predetermined number of separate storage units for a quarter-pixel search that divide said partial quarter-pixel luminance data and store said partial quarter pixel luminance data by a prescribed unit as stored quarter-pixel luminance data; and a quarter-pixel motion estimation section that performs a prescribed calculation process based on a combination of said stored quarter-pixel luminance data read from said second predetermined number of separate storage units for the quarter-pixel search, to obtain a prescribed reference area after luminance calculation with quarter-pixel accuracy in both of said horizontal direction and vertical direction and perform motion estimation with quarter-pixel accuracy, said prescribed calculation process including an interpolation process in the other direction than said one direction to calculate luminance data of quarter-pixel accuracy in said other direction, wherein in said second predetermined number of separate storage units for the quarter-pixel search, said stored quarter-pixel luminance data corresponding to pixels adjacent in said other direction and four consecutive said stored quarter-pixel luminance data corresponding to pixels adjacent in units of integer pixels in said one direction are distributed among said second predetermined number of separate storage units for the quarter-pixel search to be able to be simultaneously extracted from said second predetermined number of separate storage units for the quarter-pixel search by one reading operation, said integer pixel motion estimation section in said motion estimation system outputs a reference position signal of integer-pixel accuracy as a motion estimation result, and said quarter-pixel motion estimation section in said motion estimation system for quarter-pixel luminance performs motion estimation of quarter-pixel accuracy with a reference position instructed by said reference position signal as a base point.

5. A motion estimation system for combined luminance and chrominance, comprising:

a motion estimation system;

a motion estimation system for quarter-pixel luminance; and a motion estimation system for quarter-pixel chrominance, said motion estimation system including:

a first predetermined number of separate storage units for an integer pixel search that receive luminance data of integer-pixel accuracy in a prescribed image area, divide the luminance data of integer-pixel accuracy in the prescribed image area, and store said luminance data by a prescribed unit as stored luminance data; and an integer pixel motion estimation section that extracts a prescribed reference extracted area based on a combination of said stored luminance data read from said first predetermined number of separate storage units for the integer pixel search, to perform motion estimation with integer-pixel accuracy, wherein in said first predetermined number of separate storage units for the integer pixel search, said stored luminance data corresponding to pixels adjacent in a horizontal direction and a vertical direction and four consecutive said stored luminance data corresponding to pixels adjacent in said horizontal direction are distributed among said first predetermined number of separate storage units for the integer pixel search to be able to be simultaneously extracted from said first predetermined number of separate storage units for the integer pixel search by one readingoperation, said motion estimation system for quarter-pixel luminance including:

a temporary storage unit for luminance that stores the luminance data of integer-pixel accuracy in the prescribed image area;

a quarter-pixel generation section for luminance that performs a horizontal-direction interpolation process and a vertical-direction interpolation process based on said luminance data read from said temporary storage unit for luminance to generate partial quarter-pixel luminance data, said partially quarter-pixel luminance data being luminance data of quarter-pixel accuracy only in one direction of said horizontal direction and vertical direction;

a second predetermined number of separate storage units for a quarter-pixel search that divide said partial quarter-pixel luminance data and store said partial quarter pixel luminance data by a prescribed unit as stored quarter-pixel luminance data; and a quarter-pixel motion estimation section that performs a prescribed calculation process based on a combination of said stored quarter-pixel luminance data read from said second predetermined number of separate storage units for the quarter-pixel search, to obtain a prescribed reference area after luminance calculation with quarter-pixel accuracy in both of said horizontal direction and vertical direction and perform motion estimation with quarter-pixel accuracy, said prescribed calculation process including an interpolation process in the other direction than said one direction to calculate luminance data of quarter-pixel accuracy in said other direction, wherein in said second predetermined number of separate storage units for the quarter-pixel search, said stored quarter-pixel luminance data corresponding to pixels adjacent in said other direction and four consecutive said stored quarter-pixel luminance data corresponding to pixels adjacent in units of integer pixels in said one direction are distributed among said second predetermined number of separate storage units for the quarter-pixel search to be able to be simultaneously extracted from said second predetermined number of separate storage units for the quarter-pixel search by one reading operation, said motion estimation system for quarter-pixel chrominance including:

a third predetermined number of separate storage units for a chrominance that divide chrominance data of integer-pixel accuracy in a prescribed image area and store said data in units of stored chrominance data; and a quarter-pixel generation section for chrominance that performs a calculation process based on reference position information of quarter-pixel accuracy in accordance with a combination of said stored chrominance data read from said third predetermined number of separate storage units for the chrominance, to generate a prescribed reference area after chrominance calculation of quarter-pixel accuracy as estimation result chrominance data, wherein in said third predetermined number of separate storage units for the chrominance, said stored chrominance data corresponding to pixels adjacent in a horizontal direction are stored by being superimposed in units of a first number of pixels, and a second number of consecutive said stored chrominance data corresponding to pixels adjacent in a vertical direction are distributed among said third predetermined number of separate storage units for the chrominance to be able to be simultaneously extracted from said third predetermined number of separate storage units for the chrominance by one reading operation, said integer pixel motion estimation section in said motion estimation system outputs a reference position signal of integer-pixel accuracy as a motion estimation result, said quarter-pixel motion estimation section in said motion estimation system for quarter-pixel luminance performs motion estimation of quarter-pixel accuracy with a reference position instructed by said reference position signal as a base point, to output estimation result luminance data of quarter-pixel accuracy, and said reference position information used by said motion estimation system for quarter-pixel chrominance includes reference position information on said estimation result luminance data of quarter-pixel accuracy.

6. A motion estimation system for quarter-pixel luminance and chrominance, comprising:

a predetermined number of separate storage units for a quarter-pixel search that receive luminance data and chrominance data of integer-pixel accuracy in a prescribed image area, divide the luminance data and chrominance data of integer-pixel accuracy in the prescribed image area, and store said luminance data and chrominance data by prescribed unit as stored luminance data and stored chrominance data, respectively; and a quarter-pixel motion estimation section that performs a prescribed calculation process based on a combination of said stored luminance data read from said predetermined number of separate storage units for the quarter-pixel search, to obtain a prescribed reference area after luminance calculation with quarter-pixel accuracy in both a horizontal direction and a vertical direction and perform motion estimation thus obtaining estimation result luminance data, and generates a prescribed reference area after chrominance calculation of quarter-pixel accuracy as estimation result chrominance data based on a combination of said stored chrominance data read from said predetermined number of separate storage units for the quarter-pixel search, said prescribed reference area after chrominance calculation corresponding to position information of quarter-pixel accuracy of said estimation result luminance data, wherein in said predetermined number of separate storage units for the quarter-pixel search, said stored luminance data corresponding to pixels adjacent in said horizontal direction are stored by being superimposed in units of a first number of pixels, a second number of consecutive said stored luminance data corresponding to pixels adjacent in said vertical direction are distributed among said predetermined number of separate storage units for the quarter-pixel search, and said stored chrominance data corresponding to pixels adjacent in said horizontal direction and a third number of consecutive said stored chrominance data corresponding to pixels adjacent in said vertical direction are distributed among said predetermined number of separate storage units for the quarter-pixel search to be able to be simultaneously extracted from said predetermined number of separate storage units for the quarter-pixel search by one reading operation.

* * * * *